United States Patent
Yerramalli et al.

(10) Patent No.: US 11,109,285 B2
(45) Date of Patent: Aug. 31, 2021

(54) MULTI-PCELL DESIGN FOR URLLC RELIABILITY

(71) Applicant: QUALCOMM Incorporated, San Diego, CA (US)

(72) Inventors: Srinivas Yerramalli, San Diego, CA (US); Xiaoxia Zhang, San Diego, CA (US); Tamer Kadous, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/420,075

(22) Filed: May 22, 2019

(65) Prior Publication Data

US 2019/0364468 A1 Nov. 28, 2019

Related U.S. Application Data

(60) Provisional application No. 62/676,208, filed on May 24, 2018.

(51) Int. Cl.
*H04W 36/00* (2009.01)
*H04W 36/30* (2009.01)

(52) U.S. Cl.
CPC ... *H04W 36/0069* (2018.08); *H04W 36/0085* (2018.08); *H04W 36/305* (2018.08)

(58) Field of Classification Search
None
See application file for complete search history.

(56) References Cited

U.S. PATENT DOCUMENTS

| 10,779,232 B1 * | 9/2020 | Lunden | H04W 24/08 |
| 2013/0260741 A1 * | 10/2013 | Yamada | H04L 1/0026 455/422.1 |

(Continued)

OTHER PUBLICATIONS

"3rd Generation Partnership Project, Technical Specification Group Radio Access Network, Evolved Universal Terrestrial Radio Access (E-UTRAN), Radio Resource Control (RRC), Protocol Specification (Release 15)" 3GPP Draft; Draft R2-180XXXX TS 36.331 Baseline CR for the UE Capabilities REV1, 3rd Generation Partnership Project (3GPP), Mobile Competence Centre, 650, Route Des Lucioles ; F-06921 Sophia-Antipolis Cedex, France, May 23, 2018 (May 23, 2018), 786 Pages, XP051566213, Retrieved from the Internet: URL: http://www.3gpp.org/ftp//Specs/archive/36_series/36.331/36331-f10.zip [retrieved on May 23, 2018], Section 5.5.2.1, 5.5.3.1, 5.3.10.3.a-5.3.10.3.c, 5.5.4.9, 5.5.4.10, 5.5.2.1, 5.5.3.3, 5.5.3.1, 5.3.10.7, 5.3.11, 5.6.2, 5.6.3, 5.6.5 and 5.5.5.

(Continued)

*Primary Examiner* — Anh Vu H Ly
(74) *Attorney, Agent, or Firm* — Qualcomm Incorporated

(57) ABSTRACT

Aspects of the present disclosure provide a mechanism for improving reliability in a wireless communication network supporting a multi-cell transmission environment including a primary cell (PCell) and one or more secondary cells (SCells). In some examples, a user equipment (UE) in a connected mode with a PCell for multi-cell communication with the PCell and one or more SCells may utilize link quality measurements on both the PCell and one or more SCells to manage the connection with the PCell. In other examples, one or more SCells may function as a PCell to transmit common control signaling to the UE and/or receive uplink control information from the UE. In other examples, a UE in an idle mode may evaluate the reference signals transmitted from the PCell and one or more potential SCells (Continued)

before deciding whether to connect to the PCell for multi-cell communication.

28 Claims, 13 Drawing Sheets

(56) References Cited

U.S. PATENT DOCUMENTS

| | | | | |
|---|---|---|---|---|
| 2014/0169321 | A1* | 6/2014 | Imamura | H04L 5/0035 |
| | | | | 370/329 |
| 2014/0247796 | A1* | 9/2014 | Ouchi | H04L 5/0053 |
| | | | | 370/329 |
| 2014/0341143 | A1* | 11/2014 | Yang | H04L 5/001 |
| | | | | 370/329 |
| 2016/0043843 | A1* | 2/2016 | Liu | H04W 72/0446 |
| | | | | 370/329 |
| 2016/0219475 | A1* | 7/2016 | Kim | H04W 76/27 |
| 2016/0255580 | A1* | 9/2016 | Onaka | H04W 24/02 |
| | | | | 370/311 |
| 2016/0262118 | A1* | 9/2016 | Kim | H04W 52/365 |
| 2017/0142751 | A1* | 5/2017 | Liu | H04W 74/0816 |
| 2018/0192426 | A1* | 7/2018 | Ryoo | H04W 74/0833 |
| 2018/0220345 | A1* | 8/2018 | Moon | H04W 36/0072 |
| 2018/0332590 | A1* | 11/2018 | Johansson | H04W 72/042 |
| 2018/0359790 | A1* | 12/2018 | Ingale | H04W 28/16 |
| 2019/0116585 | A1* | 4/2019 | Chakraborty | H04W 52/0235 |
| 2019/0334673 | A1* | 10/2019 | Axelsson | H04L 5/0051 |
| 2020/0029237 | A1* | 1/2020 | Kim | H04W 68/06 |

OTHER PUBLICATIONS

"3rd Generation Partnership Project, Technical Specification Group Radio Access Network; NR; Physical Layer Measurements (Release 15)", 3GPP Standard; Technical Specification; 3GPP TS 38.215, 3rd Generation Partnership Project (3GPP), Mobile Competence Centre, 650, Route Des Lucioles ; F-06921 Sophia-Antipolis Cedex, France, vol. RAN WG1, No. V15.1.0, Apr. 2, 2018 (Apr. 2, 2018), pp. 1-15, XP051450730, [retrieved on Apr. 2, 2018], Section 5.
Catt et al.," S-Measure in CA", 3GPP Draft; R2-102797, 3rd Generation Partnership Project (3GPP), Mobile Competence Centre, 650, Route Des Lucioles ; F-06921 Sophia-Antipolis Cedex, France, vol. RAN WG2, No. Montreal, Canada; May 10, 2010, May 4, 2010 (May 4, 2010), 2 Pages, XP050423139, [retrieved on May 4, 2010], Sections 1.
International Search Report and Written Opinion—PCT/US2019/033804—ISA/EPO—Jul. 29, 2019.

* cited by examiner

MULTI-PCELL DESIGN FOR URLLC RELIABILITY

PRIORITY CLAIM

This application claims priority to and the benefit of Provisional Patent Application No. 62/676,208, entitled "Multi-PCell Design for URLLC Reliability," filed in the U.S. Patent and Trademark Office on May 24, 2018, the entire contents of which are incorporated herein by reference as if fully set forth below in their entirety and for all applicable purposes.

TECHNICAL FIELD

The technology discussed below relates generally to wireless communication systems, and more particularly, to multi-cell configurations in wireless communication systems.

INTRODUCTION $3^{rd}$ Generation Partnership Project (3GPP) New Radio (NR) specifications (often referred to as 5G) support ultra-reliable and low-latency communications (URLLC), e.g., a reliability of less than 1e-5 and a latency of less than 2 ms, between a user equipment (UE) and a base station. To meet the URLLC requirements, 5G wireless communication networks may utilize a coordinated multi-point (CoMP) network configuration in which transmissions from multiple transmission points (TRPs) may be simultaneously directed towards a UE. In a multi-TRP transmission scheme, multiple TRPs may or may not be co-located and may or may not be within a same cell. Each of the multiple TRPs may transmit the same or different data to a user equipment (UE). When transmitting different data from the multiple TRPs, a higher throughput may be achieved. When transmitting the same data (with potentially different redundancy versions) from the multiple TRPs, transmission reliability may be improved.

In some examples, each TRP may utilize the same carrier frequency to communicate with a UE. In other examples, each TRP may utilize a different carrier frequency (referred to as a component carrier) and carrier aggregation may be performed at the UE. In this example, the multi-TRP transmission scheme may be referred to as a multi-carrier or multi-cell transmission scheme. In a multi-carrier or multi-cell transmission scheme, there are a number of serving cells, each utilizing a different component carrier for communication with the UE. One of the serving cells may be referred to as a Primary serving cell (PCell), while the other serving cells may be referred to as Secondary serving cells (SCells). The PCell maintains the primary connection with the UE and is responsible for the radio resource control (RRC) connection setup. In addition, physical uplink control channel (PUCCH) transmissions from the UE to the base station occur on the PCell. Enhancements in multi-cell environments continue to be made to improve the reliability of URLLC transmissions.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Various aspects of the disclosure relate to mechanisms for improving reliability in a wireless communication network supporting a multi-cell transmission environment including a primary cell (PCell) and one or more secondary cells (SCells). In some examples, a UE in an idle mode may evaluate the reference signals transmitted from the PCell and one or more potential SCells before deciding whether to connect to the PCell for multi-cell communication.

In some examples, a user equipment (UE) in a connected mode with a PCell for multi-cell communication with the PCell and one or more SCells may utilize link quality measurements on both the PCell and one or more SCells to manage the connection with the PCell. For example, the UE may measure the received power (e.g., a reference signal received power (RSRP) or received signal strength indicator (RSSI)) of measurement signals (e.g., reference signals) transmitted on the respective carriers of each of the PCell and one or more SCells and calculate an overall received power, which may be an average received power, a maximum received power, or a weighted averaged received power, from the measured received powers. The overall received power may then be transmitted to the PCell to facilitate radio resource management (RRM) of the PCell and SCell links.

As another example, the UE may measure the signal-to-interference-plus-noise ratio (SINR) of measurement signals (e.g., physical downlink control channels) transmitted on respective carriers from each of the PCell and SCells and determine the maximum SINR from the measured SINR values. The UE may then utilize the maximum SINR to determine whether a radio link failure (RLF) has occurred.

In some examples, one or more SCells may function as a PCell to transmit common control signaling to the UE and/or receive uplink control information from the UE. In this example, the UE may jointly monitor the common search space on the PCell and the SCells or the UE may switch between cells (e.g., between the PCell and one of the SCells) to monitor the common search space thereof based on an instruction received from the network. Similarly, the UE may be configured to transmit uplink control information to each of the PCell and SCells or to a selected cell (selected from the PCell and the SCells). Such a configuration results in a multi-PCell environment.

In one example, a method for a user equipment to communicate in a wireless communication network including a PCell and a SCell is disclosed. The method includes receiving a first reference signal on a first carrier from the PCell, receiving a second reference signal on a second carrier from the SCell, and connecting to the PCell for multi-cell communication with the PCell and the SCell based on a joint evaluation of both the first reference signal and the second reference signal.

Another example provides a scheduled entity in a wireless communication network including a PCell and a SCell. The scheduled entity includes a transceiver, a memory, and a processor communicatively coupled to the transceiver and the memory. The processor is configured to receive a first reference signal on a first carrier from the PCell, receive a second reference signal on a second carrier from the SCell, and connect to the PCell for multi-cell communication with the PCell and the SCell based on a joint evaluation of both the first reference signal and the second reference signal.

Another example provides a scheduled entity in a wireless communication network including a PCell and a SCell. The scheduled entity includes means for receiving a first reference signal on a first carrier from the PCell, means for receiving a second reference signal on a second carrier from the SCell, and means for connecting to the PCell for multi-cell communication with the PCell and the SCell based on a joint evaluation of both the first reference signal and the second reference signal.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
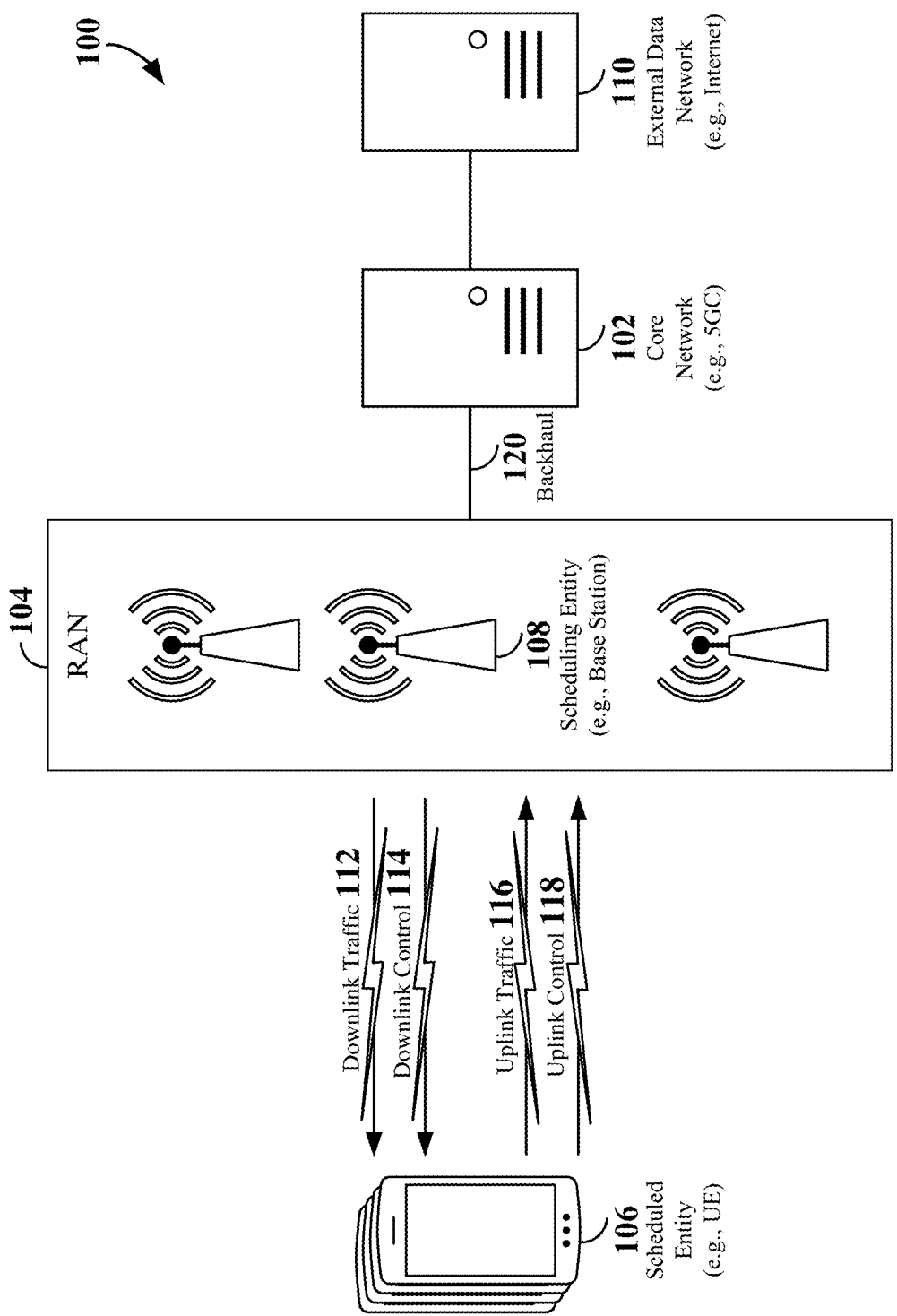
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
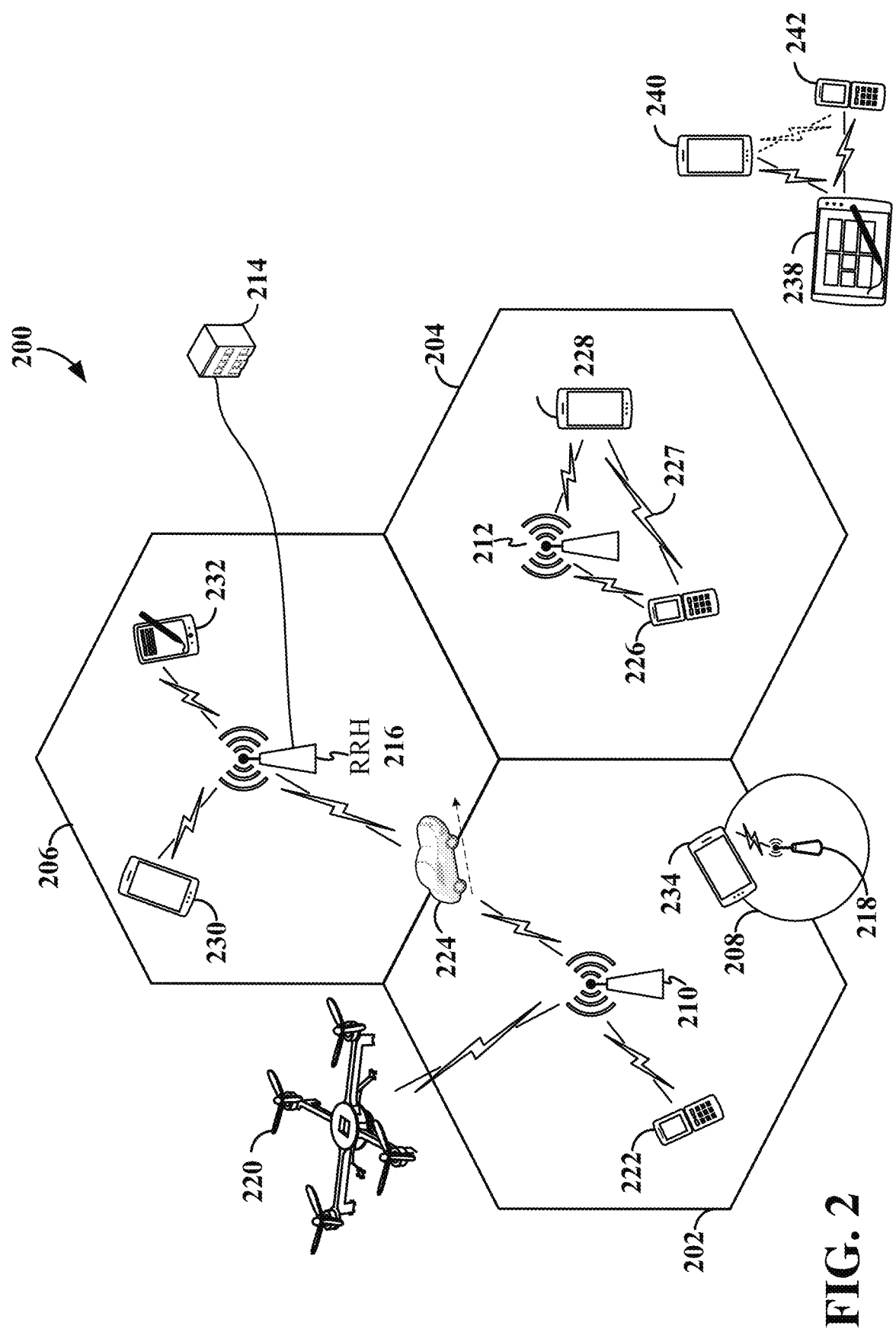
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE.

For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing OFDM with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), OFDM, sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still expected to access unlicensed spectrum, generally, any operator or device may gain access. Shared spectrum may fall between licensed and unlicensed spectrum, wherein technical rules or limitations may be used to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, 5G networks (e.g., RAN 200) may further support carrier aggregation of a primary cell (PCell) and one or more secondary cells (SCells). Each of the PCell and SCells may transmit the same or different data to a UE. In addition, the PCell and each of the SCells may utilize a different carrier frequency (referred to as a component carrier) and carrier aggregation may be performed at the UE. The PCell maintains the primary connection with the UE and is responsible for the radio resource control (RRC) connection setup. In addition, physical uplink control channel (PUCCH) transmissions from the UE to the base station occur on the PCell.

In 5G NR, carrier aggregation can utilize component carriers in the same band or different bands. In some examples, the carriers may include licensed bands (e.g., 5G, 4G using various licensed bands) and unlicensed bands (e.g., Wi-Fi, using industrial, scientific, and medical (ISM) bands and Unlicensed National Information Infrastructure (U-NII) bands). In some examples, a single radio resource control (RRC) layer can configure carrier aggregation using sub-6 GHz carriers and above-6 GHz carriers such as millimeter wave (mmW) carriers. For example, the PCell or anchor cell may configure carrier aggregation to offload data traffic to one or more component carriers, each of which corresponds to an SCell. In some examples, the PCell may use sub-6 GHz carriers, and the SCells may use above-6 GHz carriers (e.g., mmW carriers).

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
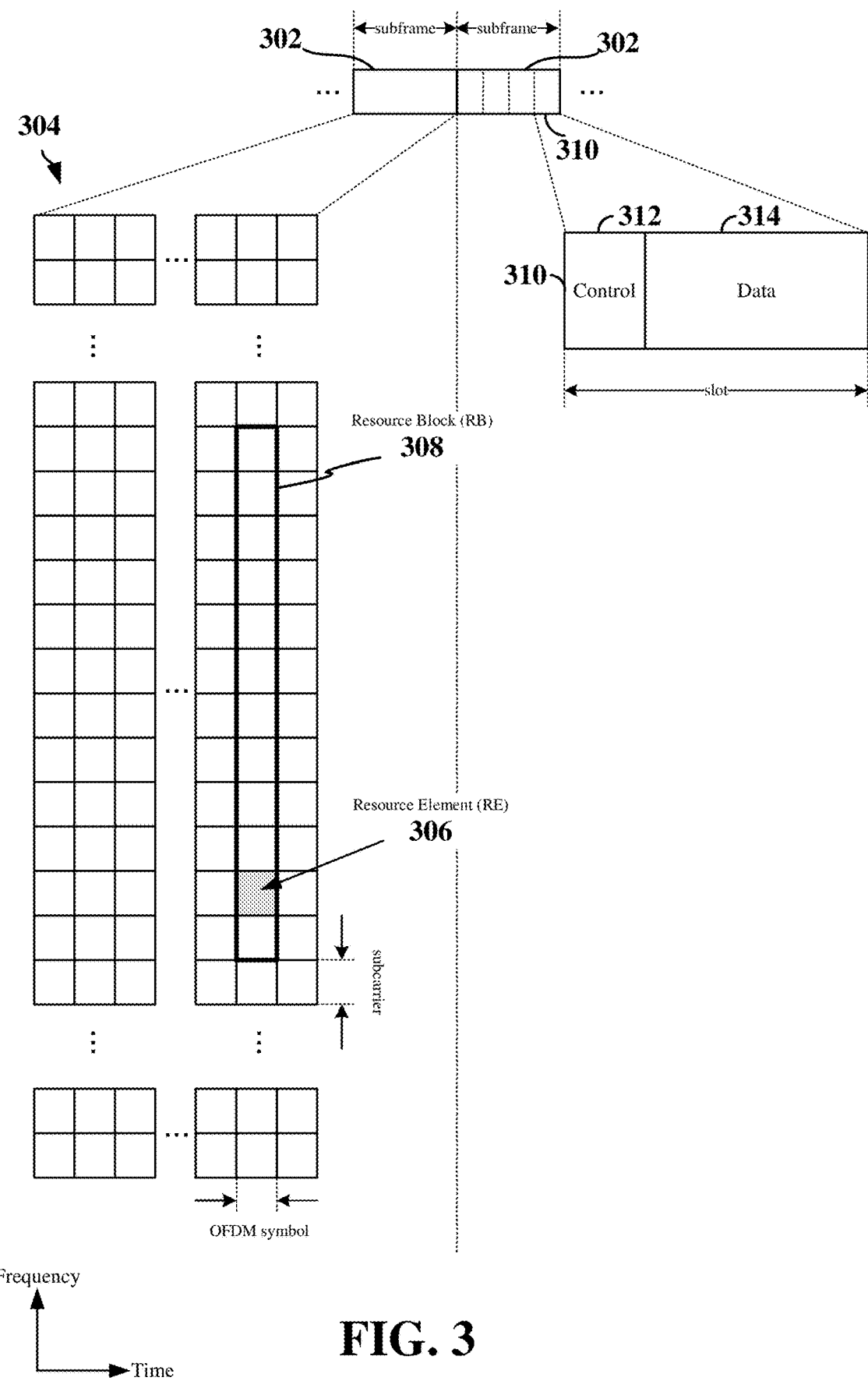
FIG. 3 is a schematic illustration of an organization of wireless resources in an air interface utilizing orthogonal frequency divisional multiplexing (OFDM).

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. The PDCCH may carry downlink control information (DCI) for one or more UEs in a cell. This can include, but is not limited to, power control commands, scheduling information, a grant, and/or an assignment of REs for DL and UL transmissions.

In addition, DL REs may be allocated to carry DL physical signals that generally do not carry information originating from higher layers. These DL physical signals may include a primary synchronization signal (PSS); a secondary synchronization signal (SSS); demodulation reference signals (DMRS); phase-tracking reference signals (PT-RS); channel-state information reference signals (CSI-RS); etc. The synchronization signals PSS and SSS (collectively referred to as synchronization signals (SS)), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize nonconsecutive symbols for an SS block, within the scope of the present disclosure.

In an UL transmission, a transmitting device (e.g., a scheduled entity 106) may utilize one or more REs 306 to carry UL control information 118 (UCI). The UCI can originate from higher layers via one or more UL control channels, such as a PUCCH, a physical random access channel (PRACH), etc., to the scheduling entity 108. Further, UL REs may carry UL physical signals that generally do not carry information originating from higher layers, such as demodulation reference signals (DMRS), phase-tracking reference signals (PT-RS), SRSs, etc. In some examples, the control information 118 may include a scheduling request (SR), i.e., a request for the scheduling entity 108 to schedule uplink transmissions. Here, in response to the SR transmitted on the control channel, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In some examples, the scheduling entity and/or scheduled entity may be configured for beamforming and/or multiple-input multiple-output (MIMO) technology to improve reliability and increase the data rate. In some examples, beamforming and/or MIMO may be utilized in NR 5G networks to meet requirements for ultra-reliable and low-latency communication (URLLC).

Figure 4:
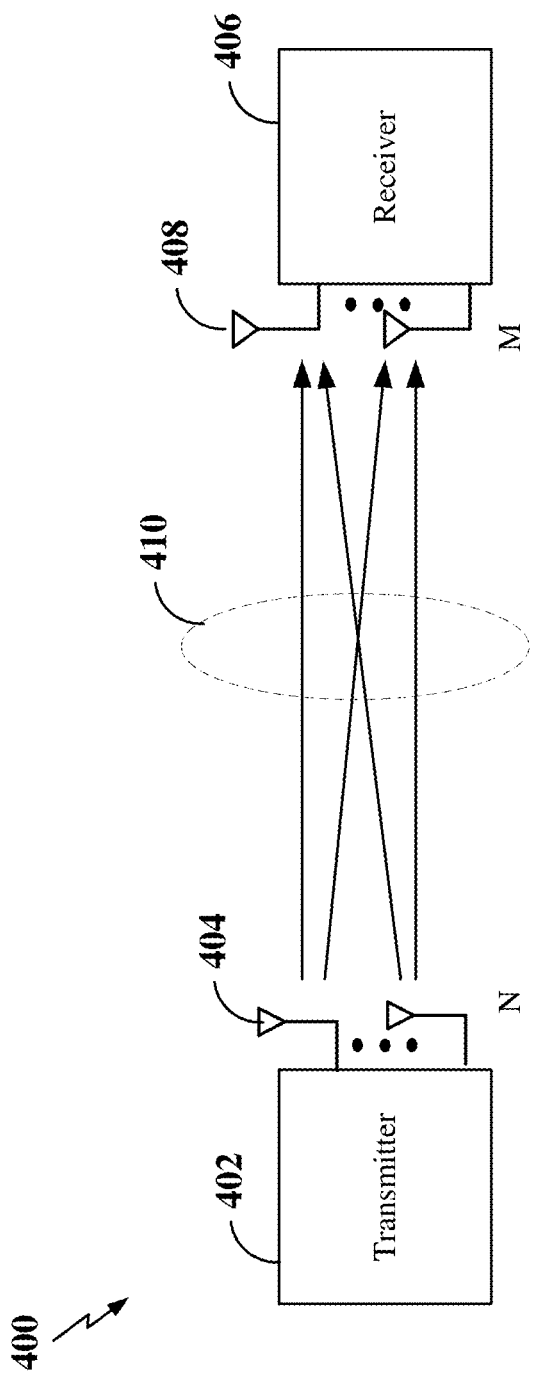
FIG. 4 is a block diagram illustrating a wireless communication system supporting multiple-input multiple-output (MIMO) communication.

FIG. 4 illustrates an example of a wireless communication system 400 supporting MIMO technology. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduled entity, a scheduling entity or other wireless communication device.

The use of MIMO technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The traffic streams may be transmitted to a single scheduled entity or UE to increase the data rate or to multiple scheduled entities or UEs to increase the overall system capacity, the latter being referred to as multi-user MIMO (MU-MIMO). This is achieved by spatially precoding each traffic stream (i.e., applying a scaling of an amplitude and a phase) and then transmitting each spatially precoded stream through multiple transmit antennas on the downlink. The spatially precoded traffic streams arrive at the UE(s) with different spatial signatures, which enables each of the UE(s) to recover the one or more traffic streams destined for that UE. On the uplink, each scheduled entity or UE transmits a spatially precoded traffic stream, which enables the scheduling entity to identify the source of each spatially precoded traffic stream.

The number of traffic streams or layers corresponds to the rank of the transmission. In general, the rank of the MIMO system 400 is limited by the number of transmit or receive antennas 404 or 408, whichever is lower. In addition, the channel conditions at the scheduled entity, as well as other considerations, such as the available resources at the scheduling entity, may also affect the transmission rank. For example, the rank (and therefore, the number of traffic streams) assigned to a particular scheduled entity on the downlink may be determined based on a rank indicator (RI) transmitted from the scheduled entity to the scheduling entity. The RI may be determined based on the antenna configuration (e.g., the number of transmit and receive antennas) and the SINR on each of the receive antennas. The RI may indicate, for example, the number of layers that may be supported under the current channel conditions. The scheduling entity may use the RI, along with resource information (e.g., the available resources and amount of data to be scheduled for the scheduled entity), to assign a transmission rank to the scheduled entity.

In Time Division Duplex (TDD) systems, the uplink and downlink are reciprocal in that each uses different time slots of the same frequency bandwidth. As such, in TDD systems, the scheduling entity may assign the rank based on uplink SINR measurements (e.g., based on a SRS) transmitted from the scheduled entity or other pilot signal). Based on the assigned rank, the scheduling entity may then transmit the CSI-RS with separate C-RS sequences for each layer to provide for multi-layer channel estimation. From the CSI-RS, the scheduled entity may measure the channel quality across layers and resource blocks and feedback channel state information, including for example, a channel quality indicator (CQI), precoding matrix index (PMI) and the rank indicator (RI), to the scheduling entity for use in updating the rank and assigning resource elements for future downlink transmissions.

In some examples, the scheduled entity or UE may measure the channel quality (e.g., SINR) over the entire downlink bandwidth and provide a wideband CQI to the scheduling entity. In other examples, the scheduled entity or UE may measure the channel quality over only the sub-bands for which the scheduled entity has scheduled data and provide respective CQI values for each scheduled sub-band to the scheduling entity. The CQI may include, for example, a modulation and coding scheme (MCS) index that indicates the highest modulation and code rate at which the block error rate (BLER) of the channel being analyzed does not exceed 10%. In some examples, the sub-band CQI values may be determined by combining the channel quality measurements (e.g., SINR) across layers (e.g., traffic streams in MIMO systems) and resource blocks to derive a total MCS index, which may then be normalized by the number of layers, with the resulting MCS index being fed back to the scheduling entity.

In the simplest case, as shown in FIG. 4, a rank-2 spatial multiplexing transmission on a 2×2 MIMO antenna configuration will transmit one traffic stream from each transmit antenna 404. Each traffic stream reaches each receive antenna 408 along a different signal path 410. The receiver 406 may then reconstruct the traffic streams using the received signals from each receive antenna 408.

Figure 5:
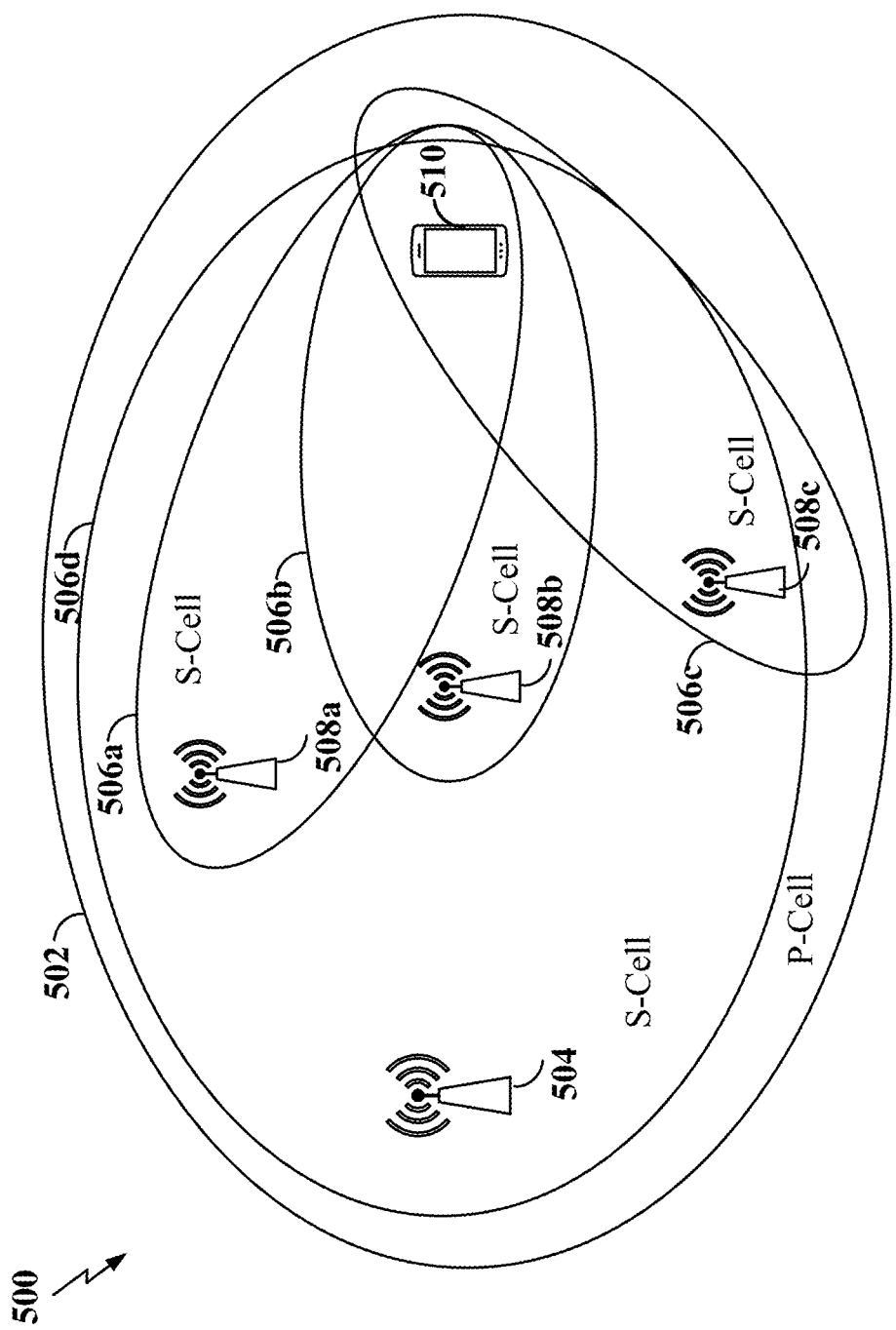
FIG. 5 is a diagram illustrating a multi-cell transmission environment.

In addition to MIMO and beamforming techniques, NR 5G networks may further improve reliability for various type of communication, such as URLLC, utilizing carrier aggregation of component carriers transmitted from different transmission and reception points (TRPs) in a multi-cell transmission environment. An example of a multi-cell transmission environment 500 is shown in FIG. 5. The multi-cell transmission environment 500 includes a PCell 502 and one or more SCells 506a, 506b, 506c, and 506d. The PCell 502 may be referred to as the anchor cell that provides a radio resource control (RRC) connection to the UE.

When carrier aggregation is configured, one or more of the SCells 506a-506d may be activated or added to the PCell 502 to form the serving cells serving a user equipment (UE) 510. Each serving cell corresponds to a component carrier (CC). The CC of the PCell 502 may be referred to as a primary CC, and the CC of a SCell 506a-506d may be referred to as a secondary CC. The PCell 502 and one or more of the SCells 506 may be served by a respective base station 504 and 508a-508c or scheduling entity similar to those illustrated in any of FIGS. 1, 2, and 4. In the example shown in FIG. 5, SCells 506a-506c are each served by a respective base station 508a-508c. However, SCell 506d is quasi co-located (QCL) with the PCell 502. For example, base station 504 may include multiple TRPs, each supporting a different carrier. The coverage of the QCL'd PCell 502 and SCell 506d may differ since component carriers in different frequency bands may experience different path loss.

The PCell 502 may add or remove one or more of the SCells 506a-506d to improve reliability of the connection to the UE 510 and/or increase the data rate. However, the PCell 502 may only be changed upon a handover to another PCell.

In some examples, the PCell 502 may be a low band cell, and the SCells 506 may be high band cells. A low band (LB) cell uses a CC in a frequency band lower than that of the high band cells. For example, the high band cells may use mmW CC, and the low band cell may use a CC in a band (e.g., sub-6 GHz band) lower than mmW. In general, a cell using a mmW CC can provide greater bandwidth than a cell using a low band CC. In addition, when using above-6 GHz frequency (e.g., mmW) carriers, beamforming may be used to transmit and receive signals.

The PCell 502 is responsible not only for connection setup, but also for radio resource management (RRM) and radio link monitoring (RLM) of the connection with the UE 510. For example, the PCell 502 may receive uplink control channel transmissions (e.g., on a PUCCH) from the UE 510 and transmit downlink common control signaling to the UE 510 to establish and maintain the connection to the UE 510. Therefore, the connectivity of the UE 510 in the multi-cell environment 500 is dependent upon the reliability of the PCell link, which may be susceptible to fading, interference, or blockage. For example, if there is shadowing on the PCell, the UE 510 may assert radio link failure (RLF) even though the signal strength on the SCells may be acceptable.

Therefore, various aspects of the disclosure provide enhancements to multi-cell transmission schemes to improve the reliability of the connection to the UE 510. In some examples, when the UE 510 is in an idle mode, the UE 510 may jointly evaluate the signal strength of respective reference signals transmitted from the PCell 502 and one or more SCells 506a-506d associated with the PCell 502 before deciding whether to connect to the PCell for multi-cell communication. Therefore, the UE 510 may evaluate all the base stations, carriers, and TRPs involved in a multi-cell environment jointly before making a decision to connect to the PCell 502.

When the UE 510 is in a connected mode with the PCell 502 for multi-cell communication with the PCell 502 and one or more of the SCells 506a-506d, the UE 510 may utilize link/channel quality measurements on both the PCell 502 and the one or more SCells 506a-506d to manage the connection with the PCell 502. For example, to facilitate improvements to RRM, the UE 510 may measure the received power (e.g., a reference signal received power (RSRP) or received signal strength indicator (RSSI)) of measurement signals (e.g., reference signals) transmitted on the respective carriers of each of the PCell 502 and the one or more SCells 506a-506d and calculate an overall received power based on the measured received powers. The overall received power may be, for example, an average received power, a maximum received power or a weighted average received power, where the weights for the different received powers may be signaled by the PCell 502. For example, the measurement signal may be a CSI-RS or synchronization signal block (SSB), which may include, the PSS and/or SSS. The measurement signal may further be a DMRS that may be utilized for common signaling, such as for a PDCCH carrying the first system information block (SIB1) or a master information block (MIB) or a PDSCH carrying the SIB1.

The received power may be measured on all carriers or only a selected subset of carriers. However, for reliability purposes, the received power on only one of each set of QCL'd carriers may be used to calculate the overall received power. In the example shown in FIG. 5, the received power on either the PCell 502 or the SCell 506 may be used in the calculation of the overall received power. In some examples, the UE 510 may receive an indication of the carriers that are QCL'd with other carriers. A measurement report containing the overall received power may then be transmitted from the UE 510 to the base station 504 serving the PCell 502 to facilitate RRM of the PCell and SCell links.

As another example, to facilitate improvements to RLM, the UE 510 may measure the SINR of measurement signals (e.g., PDCCHs) transmitted on respective carriers from each of the serving PCell 502 and the one or more serving SCells 506a-506d and determine the maximum SINR from the measured SINR values. In some examples, the UE 510 may measure the SINR on respective PDCCHs transmitted on each of the carriers. The SINR may be measured across all beams and all carriers (even if QCL'd with another carrier) or across only a selected subset of carriers (TRPs).

In some examples, the UE 510 may then utilize the maximum SINR to determine whether a RLF has occurred. For example, the UE 510 may trigger an RLF timer based on the maximum SINR across all of the carriers (or the selected subset of carriers). In this example, the RLF timer may be triggered when the maximum SINR is less than a threshold. By utilizing the maximum SINR, RLF instances may be reduced when the PCell 502 is blocked due to shadowing or is unavailable due to interference or listen-before-talk (LBT) blocking.

To support reductions in RLF instances, one or more SCells 506a-506d may also function as a PCell to transmit common control signaling to the UE and/or receive uplink control information from the UE. Such a configuration results in a multi-PCell environment.

Grants for maintaining the connection setup may be included within the common search space (e.g., within common control information transmitted on the PDCCH). In a multi-cell transmission environment, such common control information is generally configured only on the PCell 502. However, as indicated above, if the PCell 502 is unavailable or experiences shadowing or interference, the UE 510 may determine that RLF has occurred by only monitoring the common search space on the PCell carrier. Therefore, in various aspects of the disclosure, the UE 510 may also monitor the common search space (and receive common control information) on one or more of the SCells 506a-506d.

In some examples, the UE 510 may jointly monitor the common search space on the PCell 502 and one or more of the SCells 506a-506d. For example, the PCell 502 may select one or more of the SCells 506a-506d to operate as a PCell to transmit common control information to the UE 510 in order to improve reliability of the UE connectivity. The PCell 502 may provide an indication of the selected SCells 506a-506d on which to monitor for common control information during connection setup.

In other examples, the UE 510 may switch between cells (e.g., between the PCell and one of the SCells or between SCells) to monitor the common search space thereof based on an instruction received from the network. In this example, the UE 510 may switch from one cell (e.g., the PCell or an SCell) to another cell (e.g., the PCell or an SCell) to monitor the common control information transmitted thereon based on a PCell indication received via UE or cell-specific signaling (e.g., a PDCCH or Medium Access Control-Control Element (MAC-CE)) from one or more of the serving cells.

In addition, instead of transmitting uplink control information (UCI) on the PUCCH to only the PCell 502, the UE 510 may be configured to transmit UCI to the PCell 502 and one or more of the SCells 506a-506d. In other examples, the UE 510 may be configured to transmit UCI to a single selected cell that is selected from the PCell 502 and the SCells 506a-506d.

The serving cell(s) selected for the UE 510 to monitor common control information and/or transmit UCI may be selected by the network (e.g., by the PCell 502) based on, for example, measurement reports provided by the UE 510. In some examples, the UE 510 may measure the SINR (as discussed above), CQI or other measurement on at least two of the serving cells (e.g., the PCell and one or more of the SCells) and may provide a measurement report containing the measurement(s) to the PCell 502. The PCell 502 may then select an SCell to switch to the PCell or may select one or more of the SCells to operate as PCells and provide a PCell indication indicating the serving cells operating as PCells to the UE 510. In some examples, the UE 510 may further receive a measurement configuration indicating the cell selected to receive measurement reports (e.g., an overall signal parameter, such as an overall received power or a maximum SINR). The cell selected to receive the measurement reports may be one of the cells operating as a PCell.

In some examples, the network may implement various data forwarding mechanisms to support the dynamic selection of the PCell(s). For example, all of the bearers may be anchored at the PCell 502, while the actual transmission of common control information may be via an SCell 506b selected to function as a PCell. In addition to common control signaling, the selected PCell (e.g., PCell 502 or one of the SCells 506a-506d) may further support paging, buffer status reports (BSRs), power headroom (PHR) reports, radio link control (RLC), packet data convergence protocol (PDCP), service data adaption protocol (SDAP) status reports, etc.

Figure 6:
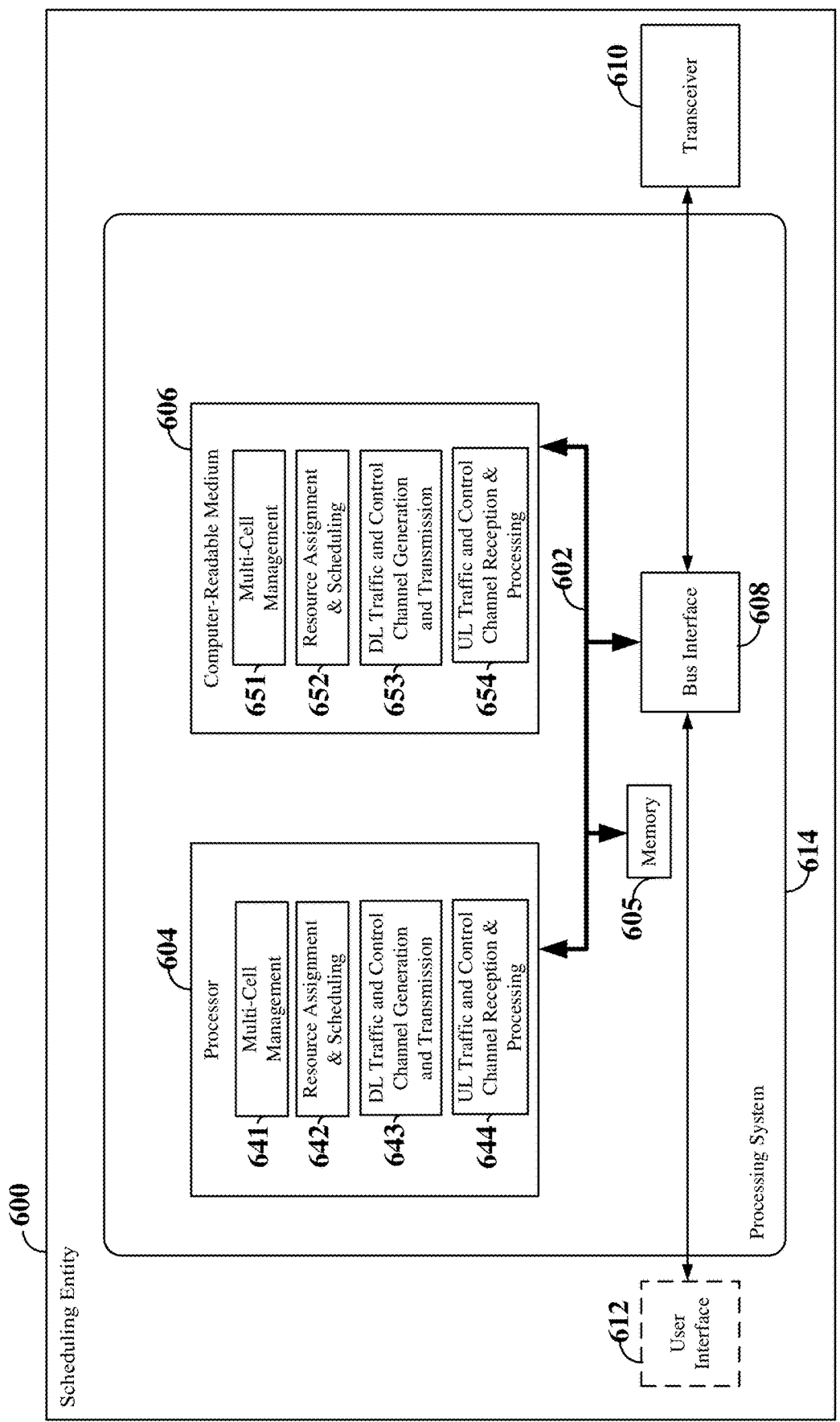
FIG. 6 is a block diagram illustrating an example of a hardware implementation for a scheduling entity employing a processing system.

FIG. 6 is a conceptual diagram illustrating an example of a hardware implementation for an exemplary scheduling entity 600 employing a processing system 614. For example, the scheduling entity 600 may be a base station as illustrated in any one or more of FIGS. 1 and 2. In another example, the scheduling entity 600 may be a user equipment (UE) as illustrated in any one or more of FIGS. 1 and 2.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes described below. The processor 604 may in some instances be implemented via a baseband or modem chip and in other implementations, the processor 604 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium (e.g., air interface). Depending upon the nature of the apparatus, a user interface 612 (e.g., keypad, display, speaker, microphone, joystick) may also be provided. Of course, such a user interface 612 is optional, and may be omitted in some examples, such as a base station.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include multi-cell management circuitry 641, configured to facilitate a multi-cell transmission environment for one or more scheduled entities (UEs). In some examples, the scheduling entity 600 may be a PCell and the multi-cell management circuitry 641 may be configured to add one or more SCells, each utilizing a different carrier, as serving cells to provide a multi-cell transmission environment for a particular scheduled entity (e.g., a UE).

The multi-cell management circuitry 641 may further be configured to receive a measurement report from the UE including one or more measurements performed by the UE. In some examples, the measurement report may include an overall received power (e.g., an average, weighted average, or maximum received power), a maximum SINR, a measured SINR on each of the PCell and SCells, a CQI, or other measurement information. The multi-cell management circuitry 641 may utilize the received measurement report to facilitate RRM and/or to configure one or more additional SCells as a PCell to improve reliability for the UE, reduce RLM instances, and avoid performing a handover to another PCell.

In some examples, the scheduling entity may be an SCell serving the UE. In this example, the multi-cell management circuitry 641 may receive an instruction via, for example, a backhaul interface, from the PCell for the scheduling entity to operate as a PCell to transmit common control information to maintain the connection with the UE and/or to receive UCI from the UE.

The multi-cell management circuitry 641 may be further configured to coordinate other downlink and uplink transmissions with the UE via a backhaul interface connection or other connection to a base station associated with a PCell or an SCell. The multi-cell management circuitry 641 may further be configured to execute multi-cell software 651 stored on the computer-readable medium 606 to implement one or more of the functions described herein.

The processor 604 may further include resource assignment and scheduling circuitry 642, configured to generate, schedule, and modify a resource assignment or grant of time-frequency resources (e.g., a set of one or more resource elements). For example, the resource assignment and scheduling circuitry 642 may schedule time-frequency resources within a plurality of TDD and/or FDD subframes, slots, and/or mini-slots to carry user data traffic and/or control information to and/or from multiple UEs (scheduled entities). In some examples, the resource assignment and scheduling circuitry 642 may operate in coordination with the multi-cell management circuitry 641 to schedule multi-cell transmissions to and/or from a UE. The resource assignment and scheduling circuitry 642 may further be configured to execute resource assignment and scheduling software 652 stored on the computer-readable medium 606 to implement one or more of the functions described herein.

The processor 604 may further include DL traffic and control channel generation and transmission circuitry 643, configured to generate and transmit downlink user data traffic and control channels within one or more subframes, slots, and/or mini-slots. The DL traffic and control channel generation and transmission circuitry 643 may operate in coordination with the resource assignment and scheduling circuitry 642 to place the DL user data traffic and/or control information onto a TDD or FDD carrier by including the DL user data traffic and/or control information within one or more subframes, slots, and/or mini-slots in accordance with the resources assigned to the DL user data traffic and/or control information. The DL traffic and control channel generation and transmission circuitry 643 may further be configured to execute DL traffic and control channel generation and transmission software 653 stored on the computer-readable medium 606 to implement one or more of the functions described herein.

The processor 604 may further include UL traffic and control channel reception and processing circuitry 644, configured to receive and process uplink control channels and uplink traffic channels from one or more scheduled entities. For example, the UL traffic and control channel reception and processing circuitry 644 may be configured to receive UCI or uplink user data traffic from one or more scheduled entities. In addition, the UL traffic and control channel reception and processing circuitry 644 may operate in coordination with the resource assignment and scheduling circuitry 642 to schedule UL user data traffic transmissions, DL user data traffic transmissions and/or DL user data traffic retransmissions in accordance with the received UCI. The UL traffic and control channel reception and processing circuitry 644 may further be configured to execute UL traffic and control channel reception and processing software 654 stored on the computer-readable medium 606 to implement one or more of the functions described herein.

Figure 7:
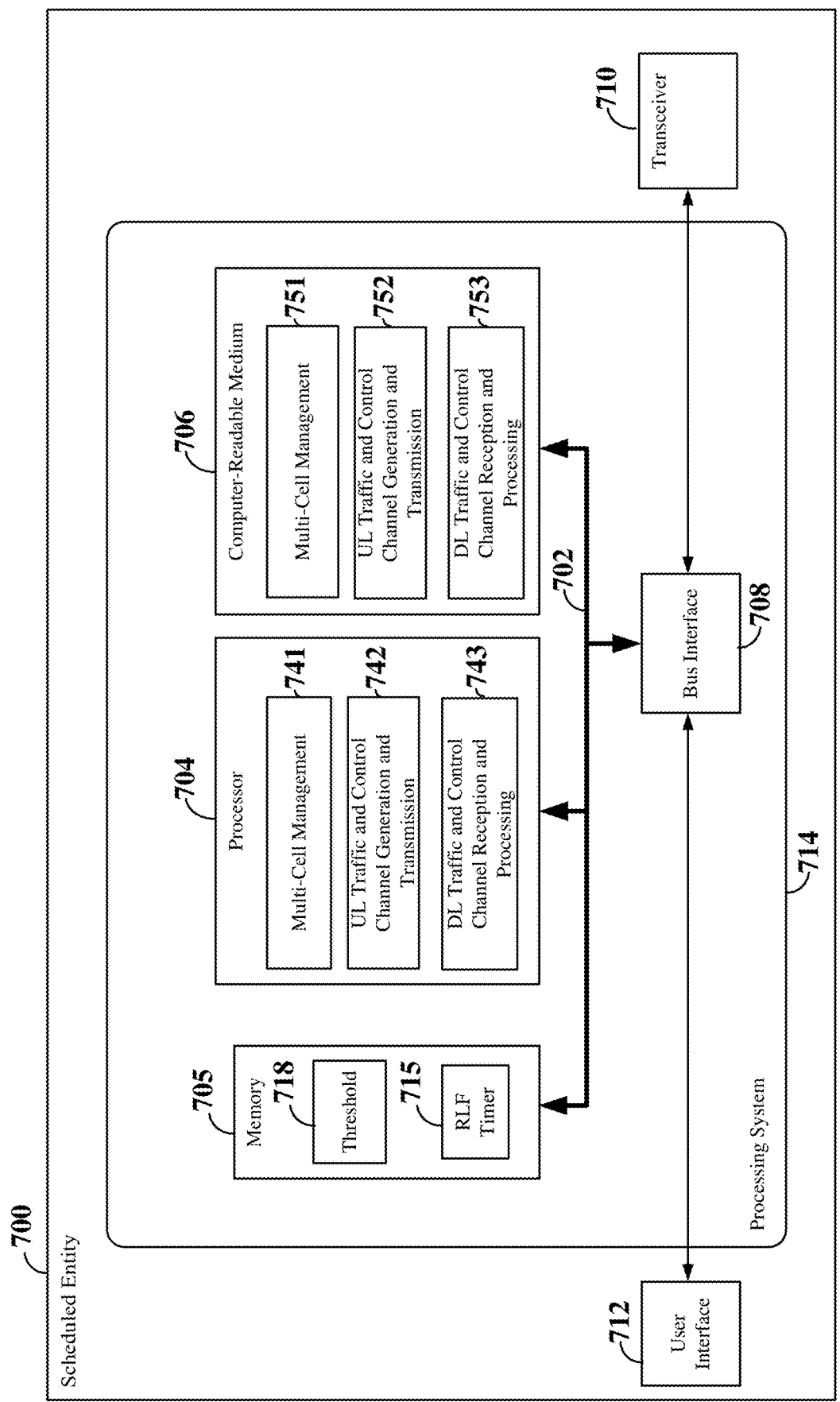
FIG. 7 is a block diagram illustrating an example of a hardware implementation for a scheduled entity employing a processing system.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1 and 2.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 8. That is, the processor 704, as utilized in a scheduled entity 700, may be used to implement any one or more of the processes described below.

In some aspects of the disclosure, the processor 704 may include multi-cell management circuitry 741, configured to facilitate simultaneous communication with one or more PCells and one or more SCells in a multi-cell transmission environment. When in idle mode, the multi-cell management circuitry 741 may jointly evaluate multiple carriers, each utilized by a different cell within the multi-cell transmission environment. For example, the multi-cell management circuitry 741 may evaluate the signal strength of respective reference signals transmitted from a PCell and one or more SCells associated with the PCell to determine whether to connect to the PCell or whether to connect to one of the SCells (as a PCell) that may have a higher signal strength. As an example, the multi-cell management circuitry 741 may be configured to evaluate a first reference signal received on a first carrier from the PCell and a second reference signal received on a second carrier from the SCell to determine whether to connect to the PCell for multi-cell communication with the PCell and the SCell.

When in connected mode, the multi-cell management circuitry 741 may be configured to utilize link/channel quality measurements on both the PCell and one or more of the SCells serving the scheduled entity 700 to manage the connection with the PCell. In some examples, the multi-cell management circuitry 741 may measure a first signal parameter of a first measurement signal received from the PCell on a first carrier and a second signal parameter of a second measurement signal received from an SCell on a second carrier. The first signal parameter may indicate a first quality of the first measurement signal and the second signal parameter may indicate a second quality of the second measurement signal. The multi-cell management circuitry 741 may then determine an overall signal parameter from the first signal parameter and the second signal parameter.

The multi-cell management circuitry 741 may further be configured to utilize the overall signal parameter to manage the connection with the PCell. In some examples, the multi-cell management circuitry 741 may be configured to manage the connection with the PCell by transmitting an indication of the overall signal parameter to at least one of the PCell and the SCell. In addition, the multi-cell management circuitry 741 may be configured to manage the connection with the PCell by switching the SCell to the PCell upon receiving an indication to switch the SCell to the PCell based on the overall signal parameter.

For example, the multi-cell management circuitry 741 may measure the received power (e.g., a RSRP or RSSI) of measurement signals (e.g., reference signals) transmitted on the respective carriers of each of the PCell and one or more of the SCells. As an example, the multi-cell management circuitry 741 may measure a first signal parameter (e.g., the RSRP or RSSI) of a first measurement signal (e.g. a reference signal, such as a synchronization signal block, channel state information reference signal or demodulation reference signal) received from the PCell on a first carrier and a second signal parameter (e.g., the RSRP or RSSI) of a second measurement signal (e.g., a reference signal, such as a synchronization signal block, channel state information reference signal or demodulation reference signal) received from an SCell on a second carrier. The multi-cell management circuitry 741 may then be configured to calculate an overall received power (e.g., an average, weighted average, or maximum received power) from the first signal parameter (e.g., a first received power) and the second signal parameter (e.g., a second received power). In examples in which the overall received power is a weighted average received power, the multi-cell management circuitry 741 may further be configured to receive a respective weight (e.g., from the PCell) to be applied to each of the first received power and the second received power for use in calculating the weighted average received power.

In some examples, the first measurement signal may be received from a first transmission and reception point (TRP) and the second measurement signal may be received from a second TRP, where the first TRP and the second TRP are in different physical locations. In other examples, the first TRP and the second TRP may be QCL'd. In this example, the multi-cell management circuitry 741 may avoid measuring the received power or exclude the measured received power on all but one of each set of QCL'd carriers. Thus, the measured received power from only one of each set of QCL'd carriers may be used in calculating the overall received power.

The multi-cell management circuitry 741 may further utilize the overall received power to manage the connection with the PCell. In some examples, the multi-cell management circuitry 741 may manage the connection with the PCell by transmitting a measurement report containing the overall received power to the PCell. In some examples, the multi-cell management circuitry 741 may utilize a measurement configuration received from the PCell indicating whether the overall signal parameter is transmitted to the PCell or the SCell.

In another example, the multi-cell management circuitry 741 may further be configured to measure the SINR of measurement signals (e.g., PDCCHs) transmitted on respective carriers from each of the serving PCell and the one or more serving SCells and determine the maximum SINR from the measured SINR values. As an example, the multi-cell management circuitry 741 may measure a first signal parameter (e.g., a first SINR) of a first measurement signal (e.g. a first PDCCH) received from the PCell on a first carrier and a second signal parameter (e.g., a second SINR) of a second measurement signal (e.g., a second PDCCH) received from an SCell on a second carrier. The multi-cell management circuitry 741 may then determine an overall signal parameter from the first signal parameter (e.g., first SINR) and the second signal parameter (e.g., second SINR). In some examples, the overall signal parameter may include a maximum SINR.

In some examples, the multi-cell management circuitry 741 may then utilize the maximum SINR to determine whether a RLF has occurred. For example, the multi-cell management circuitry 741 may trigger an RLF timer 715 maintained, for example, in memory 705 when the maximum SINR is less than a threshold 718 (maintained, for example, in memory 705). If the maximum SINR fails to increase above the threshold 718, upon expiration of the RLF timer 715, the multi-cell management circuitry 741 may determine that a RLF has occurred and drop the connection with the PCell.

The multi-cell management circuitry 741 may further be configured to enable monitoring the common search space on each carrier of each selected PCell. In addition, the multi-cell management circuitry 741 may further be configured to enable transmission of UCI to each selected PCell. In some examples, the multi-cell management circuitry 741 may be configured to receive and process first downlink common control signaling on a first carrier from the PCell and second downlink common control signaling on a second carrier from the SCell. In some examples, the first and second downlink common control signaling may include common control information transmitted on a PDCCH within a common search space (e.g., resource elements within a subframe or slot forming the common search space). The multi-cell management circuitry 741 may be configured to receive the common control signaling from the PCell and SCell via an indication that the SCell is operating as a PCell.

The multi-cell management circuitry 741 may further be configured to transmit uplink control information (e.g., on a PUCCH) on at least one of the first carrier or the second carrier. In some examples, the multi-cell management circuitry 741 may measure a first signal parameter (e.g., received power or SINR) of a first measurement signal (e.g. a reference signal or PDCCH) received from the PCell on a first carrier and a second signal parameter (e.g., received power or SINR) of a second measurement signal (e.g., a reference signal or PDCCH) received from an SCell on a second carrier. The first signal parameter may indicate a first quality of the first measurement signal and the second signal parameter may indicate a second quality of the second measurement signal. The multi-cell management circuitry 741 may then be configured to select one of the PCell or the SCell for transmission of the uplink control information thereto based on the first signal parameter and the second signal parameter. In other examples, the multi-cell management circuitry 741 may be configured to receive from the PCell an indication of a selected one of the PCell or SCell to receive the uplink control information and may transmit the uplink control information to the selected cell.

The multi-cell management circuitry 741 may further be configured to receive a PCell indication from the PCell or an SCell that indicates one or more serving cells operating as PCells. The multi-cell management circuitry 741 may further be configured to receive a measurement configuration from the PCell or an SCell that indicates one or more serving cells to receive measurement reports from the scheduled entity 700. The multi-cell management circuitry 741 may further be configured to execute multi-cell management software 751 stored on the computer-readable medium 706 to implement one or more of the functions described herein.

The processor 704 may further include uplink (UL) traffic and control channel generation and transmission circuitry 742, configured to generate and transmit uplink control/feedback/acknowledgement information on an UL control channel (e.g., a PUCCH) or UL traffic channel (e.g., a PUSCH) in accordance with an uplink grant. The UL traffic and control channel generation and transmission circuitry 742 may further be configured to generate and transmit uplink user data traffic on an UL traffic channel (e.g., a PUSCH). In some examples, the UL traffic and control channel generation and transmission circuitry 742 may be configured to transmit, via the transceiver 710, a measurement report containing the overall signal parameter to one or more the PCell and/or SCell. The UL traffic and control channel generation and transmission circuitry 742 may further be configured to transmit, via the transceiver 710, UCI to one or more of the PCell and/or SCell. The UL traffic and control channel generation and transmission circuitry 742 may further be configured to execute UL traffic and control channel generation and transmission software 752 stored on the computer-readable medium 706 to implement one or more of the functions described herein.

The processor 704 may further include downlink (DL) traffic and control channel reception and processing circuitry 743, configured for receiving and processing downlink user data traffic on a traffic channel, and to receive and process control information on one or more downlink control channels. For example, the DL traffic and control channel reception and processing circuitry 743 may be configured to receive, via the transceiver 710, reference signals and/or PDCCHs from the PCell and one or more SCells. The DL traffic and control channel reception and processing circuitry 743 may further be configured to receive an indication to switch the SCell to the PCell, an indication of a selected one of the PCell and SCell to receive UCI, a measurement configuration indicating whether the overall signal parameter is transmitted to the PCell or the SCell, and/or respective weights to be applied to each of the measured received powers from the PCell and one or more SCells. The DL traffic and control channel reception and processing circuitry 743 may further be configured to receive common control information from the PCell and one or more SCells. The DL traffic and control channel reception and processing circuitry 743 may further be configured to execute DL traffic and control channel reception and processing software 753 stored on the computer-readable medium 706 to implement one or more of the functions described herein.

Figure 8:
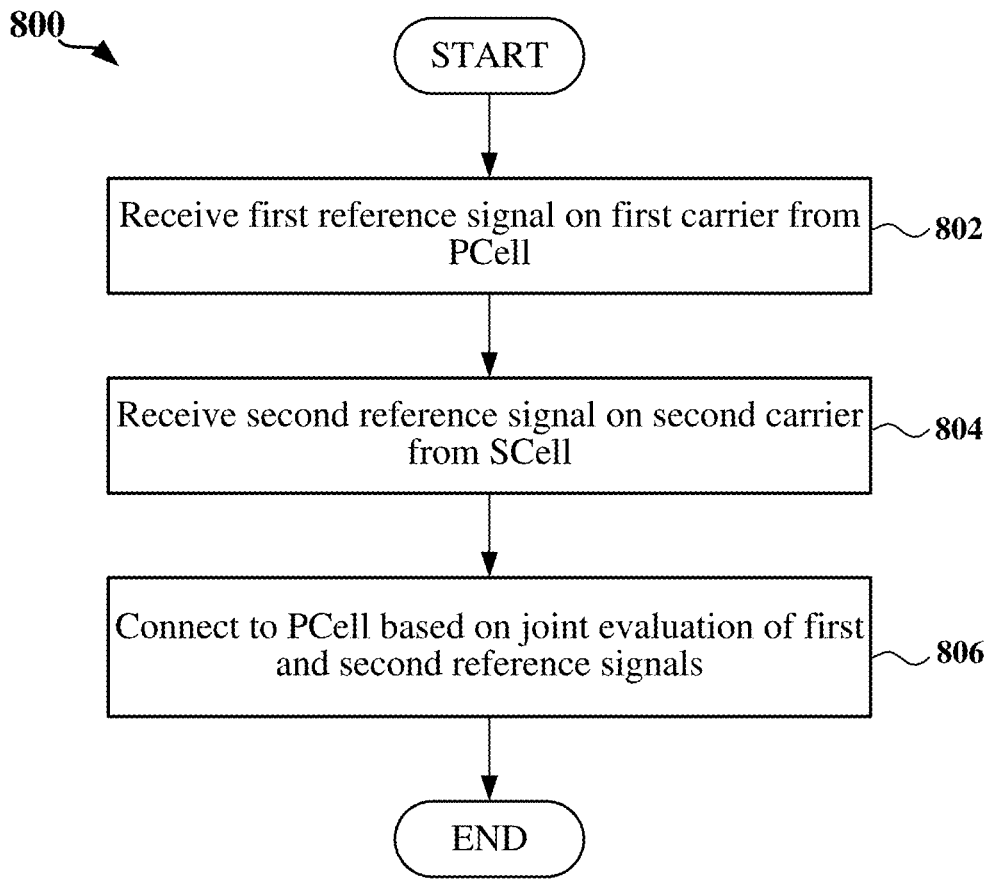
FIG. 8 is a flow chart illustrating an exemplary process for a UE to communicate in a multi-cell transmission environment.

FIG. 8 is a flow chart illustrating an exemplary process 800 for a UE to communicate in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the scheduled entity 700 illustrated in FIG. 7. In some examples, the process 800 may be carried out by any suitable apparatus or means for carrying out the functions or algorithm described below.

At block 802, the scheduled entity may receive a first reference signal on a first carrier from a PCell for multi-cell communication with the PCell and at least one SCell. At block 804, the scheduled entity may further receive a second reference signal on a second carrier from one of the SCells. It should be understood that the scheduled entity may receive a respective reference signal from each of the SCells in the multi-cell transmission environment associated with the PCell. For example, the multi-cell management circuitry 741, DL traffic and control channel reception and processing circuitry 743, and transceiver 710 shown and described above in reference to FIG. 7 may receive the reference signals from the PCell and SCell.

At block 806, the scheduled entity may connect to the PCell for multi-cell communication with the PCell and SCell based on a joint evaluation of the first and second reference signals. In some examples, the scheduled entity may measure the signal strength of each of the reference signals and connect to the PCell upon performing a joint evaluation of the signal strength of both the PCell and SCell in comparison to other surrounding PCell/SCell combinations. For example, the multi-cell management circuitry 741 shown and described above in reference to FIG. 7 may jointly evaluate both each serving cell in the multi-cell environment associated with the PCell and the PCell before connecting to the PCell.

Figure 9:
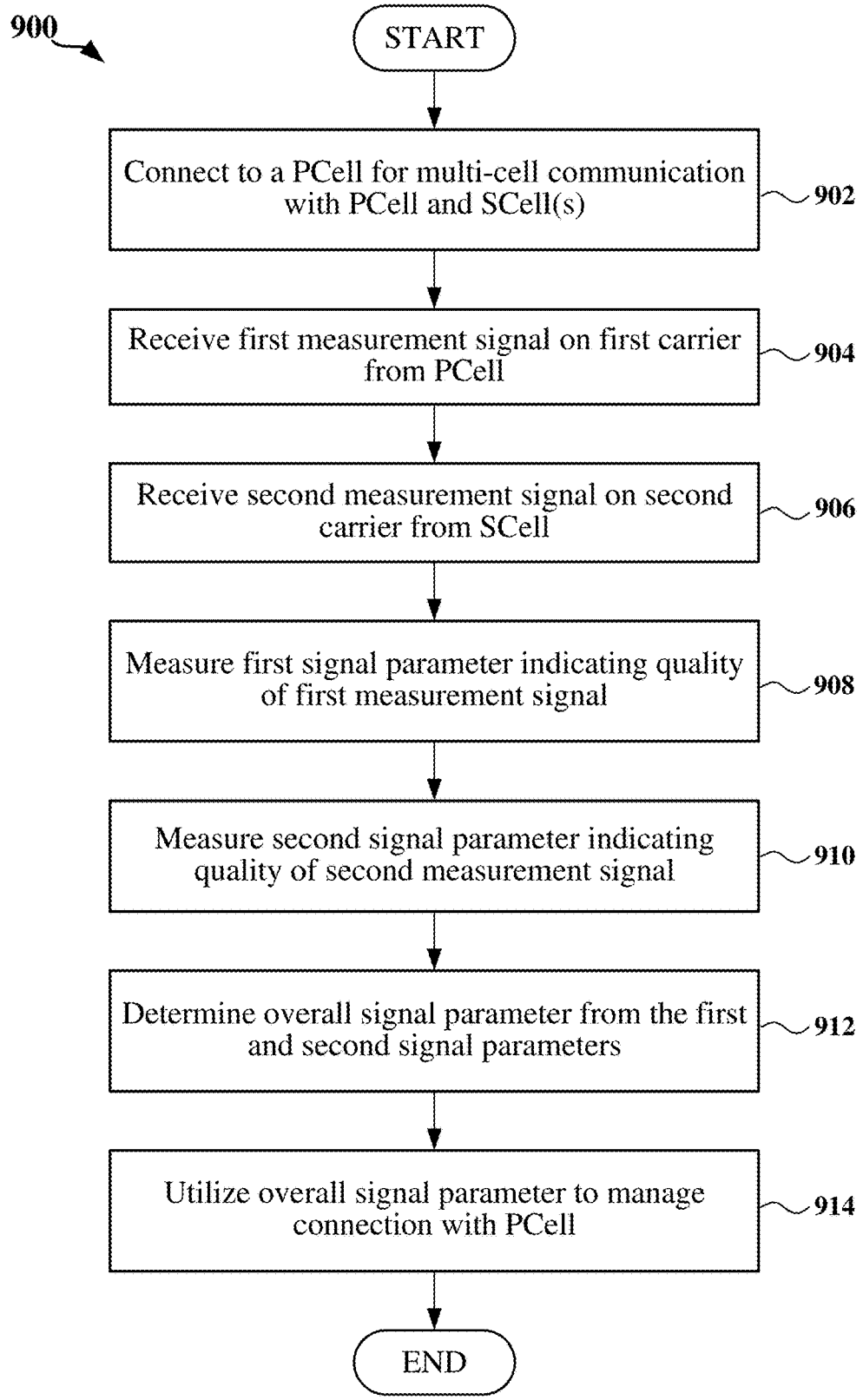
FIG. 9 is a flow chart illustrating another exemplary process for a UE to communicate in a multi-cell transmission environment.

FIG. 9 is a flow chart illustrating another exemplary process 900 for a UE to communicate in a multi-cell transmission environment in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 700 illustrated in FIG. 7. In some examples, the process 900 may be carried out by any suitable apparatus or means for carrying out the functions or algorithm described below.

At block 902, the scheduled entity may connect to a PCell for multi-cell communication with the PCell and at least one SCell. For example, the multi-cell management circuitry 741 and transceiver 710 shown and described above in reference to FIG. 7 may establish the connection.

At block 904, after connecting to the PCell and at least one SCell, the scheduled entity may receive a first measurement signal on a first carrier from the PCell. At block 906, the scheduled entity may receive a second measurement signal on a second carrier from the SCell. In some examples, the first and second measurement signals may be reference signals and/or PDCCHs, where it is understood that the first measurement signal and the second measurement signal may be different. For example, the DL traffic and control channel reception and processing circuitry 743 and transceiver 710 shown and described above in reference to FIG. 7 may receive the first and second measurement signals.

At block 908, the scheduled entity may measure a first signal parameter indicating a first quality of the first measurement signal. At block 910, the scheduled entity may measure a second signal parameter indicating a second quality of the second measurement signal. In some examples, the first and second signal parameters may be received power measurements or SINR measurements. For example, the DL traffic and control channel reception and processing circuitry 743 and multi-cell management circuitry 741 shown and described above in reference to FIG. 7 may measure the signal parameters of the first and second measurement signals.

At block 912, the scheduled entity may determine an overall signal parameter from the first and second measured signal parameters. In some examples, the overall signal parameter may include an overall received power (e.g., an average, weighted average, or maximum received power) and/or a maximum SINR. For example, the multi-cell management circuitry 741 shown and described above in reference to FIG. 7 may determine the overall signal parameter.

At block 914, the scheduled entity may utilize the overall signal parameter to manage the connection with the PCell. In some examples, the scheduled entity may transmit a measurement report containing the calculated overall received power to the PCell and/or SCell. In other examples, the scheduled entity may transmit the overall signal parameter to the PCell and/or SCell, and in response thereto, receive an indication to switch the SCell to a PCell or to communicate with one or more PCells. In still other examples, the scheduled entity may trigger a RLF based on the maximum SINR. For example, the multi-cell management circuitry 741 shown and described above in reference to FIG. 7 may utilize the overall signal parameter to manage the connection with the PCell.

Figure 10:
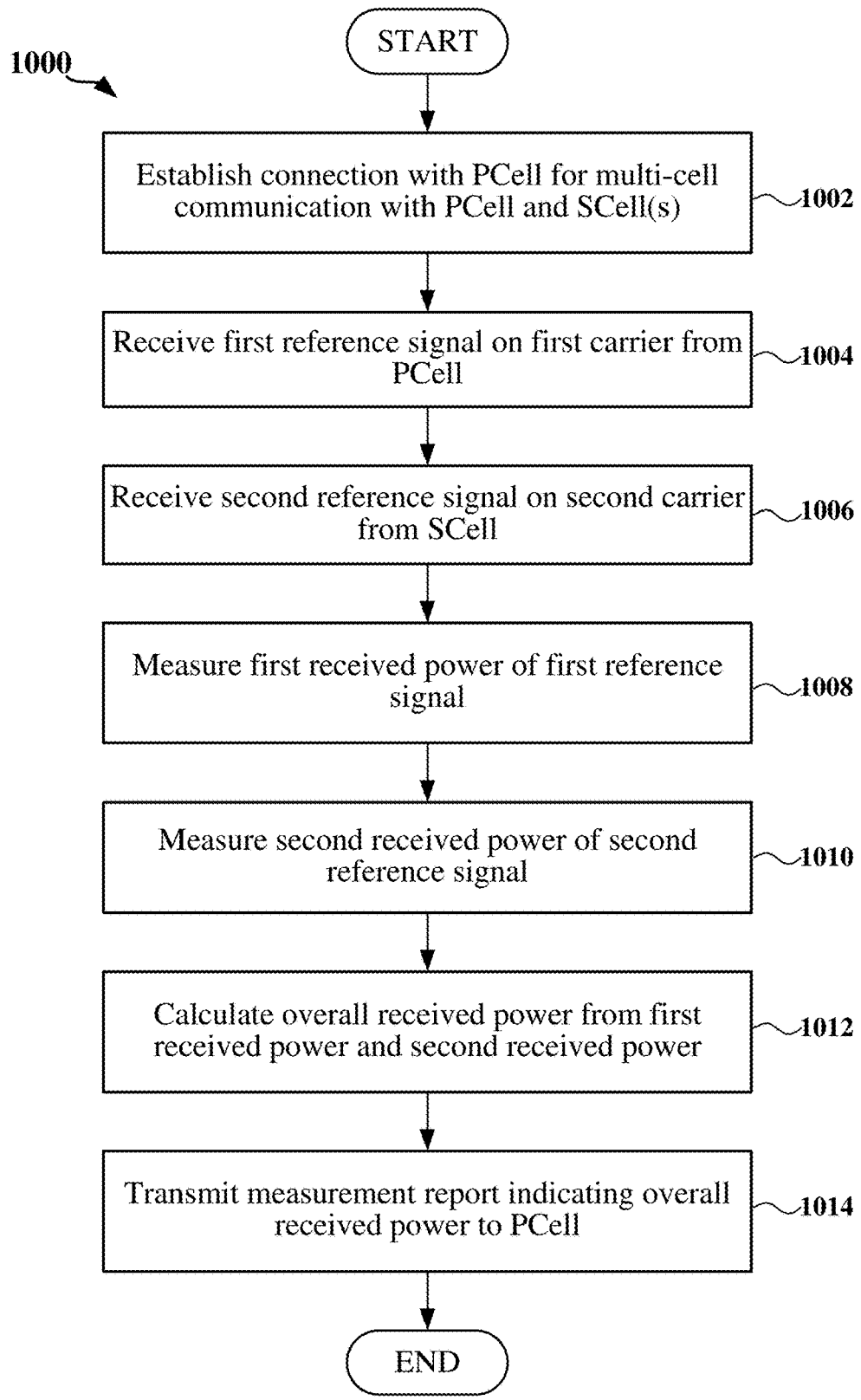
FIG. 10 is a flow chart illustrating another exemplary process for a UE to communicate in a multi-cell transmission environment.

FIG. 10 is a flow chart illustrating another exemplary process 1000 for a UE to communicate in a multi-cell transmission environment in accordance with some aspects of the present disclosure. FIG. 10 is similar to FIG. 9, where the first and second measurement signals of FIG. 9 may be first and second reference signals in FIG. 10. Furthermore, the first and second measured signal parameters of FIG. 9 may be first and second received powers in FIG. 10. As described below, some or all illustrated features may be omitted in a particular implementation within the scope of the present disclosure, and some illustrated features may not be required for implementation of all embodiments. In some examples, the process 1000 may be carried out by the scheduled entity 700 illustrated in FIG. 7. In some examples, the process 1000 may be carried out by any suitable apparatus or means for carrying out the functions or algorithm described below.

At block 1002, the scheduled entity may establish a connection with a PCell for multi-cell communication with the PCell and at least one SCell. For example, the multi-cell management circuitry 741 and transceiver 710 shown and described above in reference to FIG. 7 may establish the connection.

At block 1004, the scheduled entity may receive a first reference signal on a first carrier from the PCell. At block 1006, the scheduled entity may receive a second reference signal on a second carrier from the SCell. In some examples, the first and second reference signals may be synchronization signal blocks, channel state information reference signals or demodulation reference signals. For example, the DL traffic and control channel reception and processing circuitry 743 and transceiver 710 shown and described above in reference to FIG. 7 may receive the first and second reference signals.

At block 1008, the scheduled entity may measure a first received power of the first reference signal. At block 1010, the scheduled entity may measure a second received power of the second reference signal. For example, the DL traffic and control channel reception and processing circuitry 743 and multi-cell management circuitry 741 shown and described above in reference to FIG. 7 may measure the received powers of the first and second reference signals.

At block 1012, the scheduled entity may calculate an overall received power from the first and second received powers. In some examples, the overall received power may be an average received power, weighted average received power, or maximum received power. In examples in which the overall received power is a weighted average received power, the scheduled entity may further receive a respective weight to be applied to each of the first received power and the second received power for use in calculating the weighted average received power. In some examples, the first reference signal may be received from a first transmission and reception point (TRP) and the second reference signal may be received from a second TRP. In examples in which the first TRP and the second TRP may be QCL'd, the scheduled entity may avoid measuring the received power or exclude the measured received power on all but one of each set of QCL'd carriers. Thus, the measured received power from only one of each set of QCL'd carriers may be used in calculating the overall received power. For example, the multi-cell management circuitry 741 shown and described above in reference to FIG. 7 may calculate the overall received power.

At block 1014, the scheduled entity may transmit a measurement report indicating the overall received power the PCell. In some examples, the PCell may utilize the received measurement report to facilitate RRM and/or to configure one or more additional SCells as a PCell to improve reliability for the scheduled entity, reduce RLM instances, and avoid performing a handover to another PCell. For example, the multi-cell management circuitry 741, UL traffic and control channel generation and transmission circuitry 742 and transceiver 710 shown and described above in reference to FIG. 7 may generate and transmit the measurement report the PCell.

Figure 11:
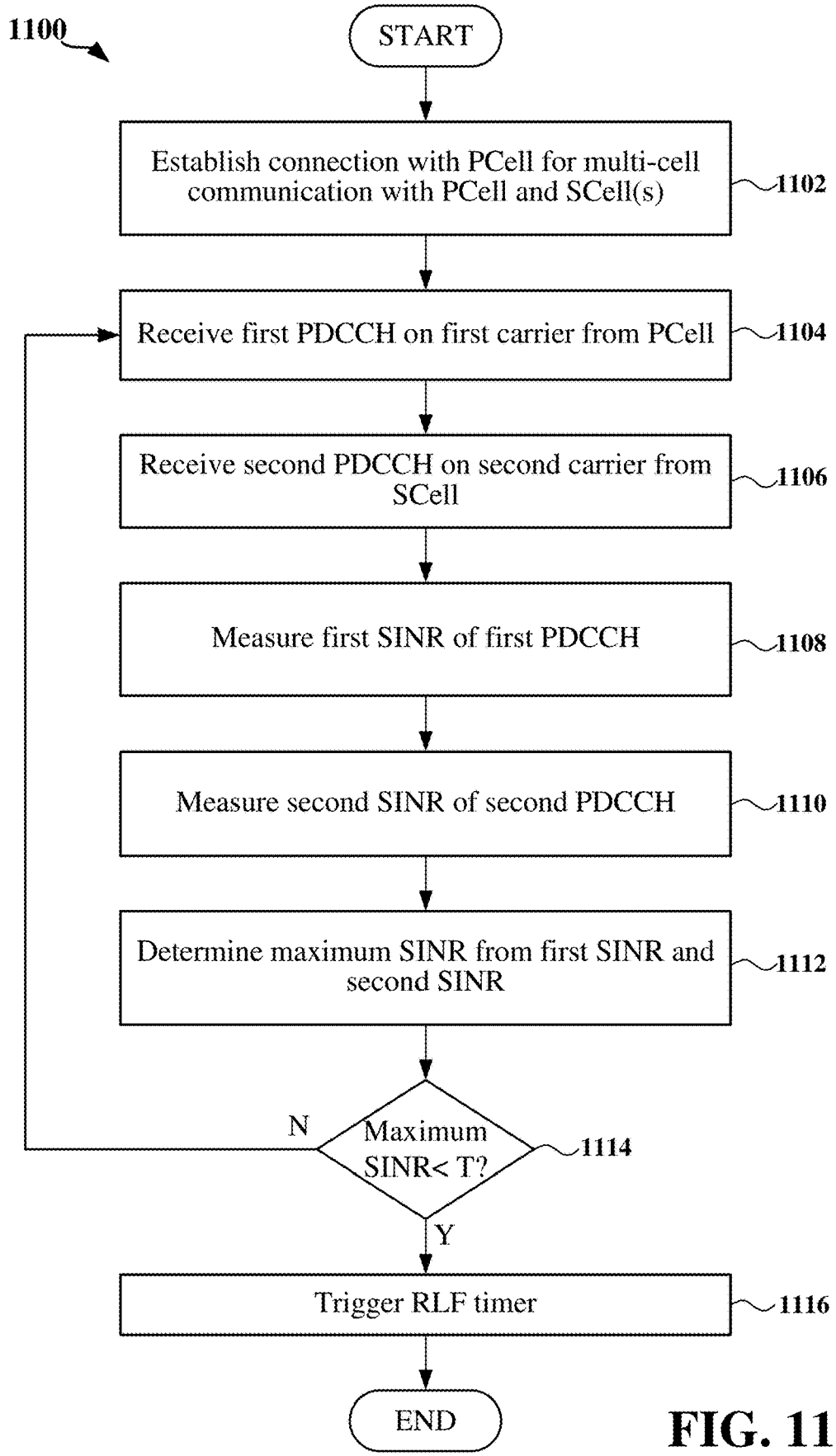
FIG. 11 is a flow chart illustrating another exemplary process for a UE to communicate in a multi-cell transmission environment.

FIG. 11 is a flow chart illustrating another exemplary process 1100 for a UE to communicate in a multi-cell transmission environment in accordance with some aspects of the present disclosure. FIG. 11 is similar to FIG. 9, where the first and second measurement signals of FIG. 9 may be first and second PDCCH signals in FIG. 11. Furthermore, the first and second measured signal parameters of FIG. 9 may be first and second SINRs in FIG. 11 As described below, some or all illustrated features may be omitted in a particular implementation within the scope of the present disclosure, and some illustrated features may not be required for implementation of all embodiments. In some examples, the process 1100 may be carried out by the scheduled entity 700 illustrated in FIG. 7. In some examples, the process 1100 may be carried out by any suitable apparatus or means for carrying out the functions or algorithm described below.

At block 1102, the scheduled entity may establish a connection with a PCell for multi-cell communication with the PCell and at least one SCell. For example, the multi-cell management circuitry 741 and transceiver 710 shown and described above in reference to FIG. 7 may establish the connection.

At block 1104, the scheduled entity may receive a first PDCCH on a first carrier from the PCell. At block 1106, the scheduled entity may receive a second PDCCH on a second carrier from the SCell. For example, the DL traffic and control channel reception and processing circuitry 743 and transceiver 710 shown and described above in reference to FIG. 7 may receive the first and second PDCCHs.

At block 1108, the scheduled entity may measure a first SINR of the first PDCCH. At block 1110, the scheduled entity may measure a second SINR of the second PDCCH. For example, the DL traffic and control channel reception and processing circuitry 743 and multi-cell management circuitry 741 shown and described above in reference to FIG. 7 may measure the SINRs of the first and second PDCCHs.

At block 1112, the scheduled entity may determine a maximum SINR from the first SINR and the second SINR. For example, the multi-cell management circuitry 741 shown and described above in reference to FIG. 7 may determine the maximum SINR.

At block 1114, the scheduled entity may compare the maximum SINR to a threshold (T). If the maximum SINR is less than T (Y branch of block 1114), at block 1116, the scheduled entity may trigger a RLF timer. Otherwise (N branch of block 1114), the process returns to block 1104. For example, the multi-cell management circuitry 741 shown and described above in reference to FIG. 7 may trigger the RLF timer when the maximum SINR is less than T.

Figure 12:
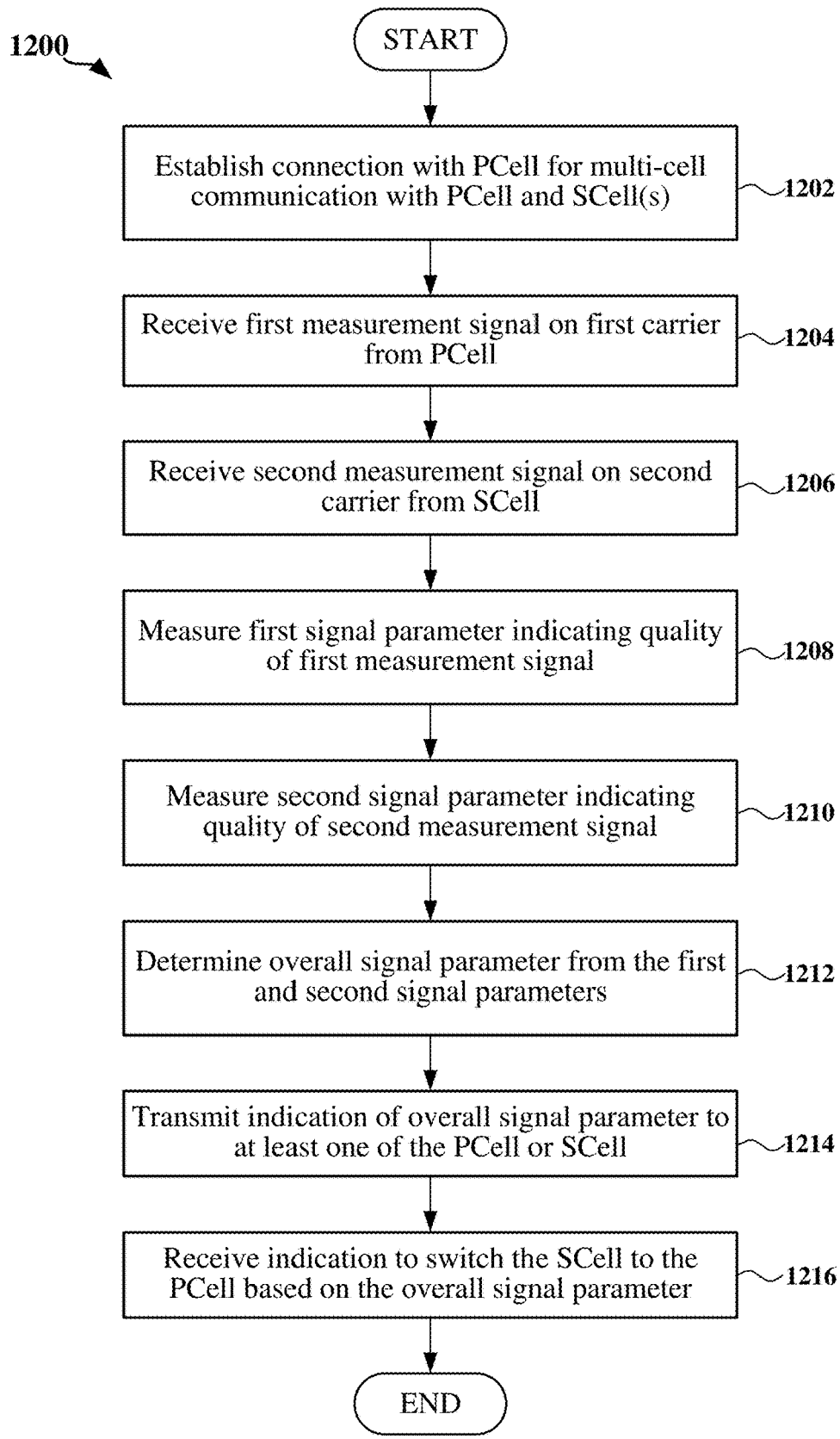
FIG. 12 is a flow chart illustrating another exemplary process for a UE to communicate in a multi-cell transmission environment.

FIG. 12 is a flow chart illustrating another exemplary process 1200 for a UE to communicate in a multi-cell transmission environment in accordance with some aspects of the present disclosure. FIG. 12 is similar to FIG. 9, where the scheduled entity may manage the connection with the PCell by transmitting the overall signal parameter to the PCell and/or SCell. As described below, some or all illustrated features may be omitted in a particular implementation within the scope of the present disclosure, and some illustrated features may not be required for implementation of all embodiments. In some examples, the process 1200 may be carried out by the scheduled entity 700 illustrated in FIG. 7. In some examples, the process 1200 may be carried out by any suitable apparatus or means for carrying out the functions or algorithm described below.

At block 1202, the scheduled entity may establish a connection with a PCell for multi-cell communication with the PCell and at least one SCell. For example, the multi-cell management circuitry 741 and transceiver 710 shown and described above in reference to FIG. 7 may establish the connection.

At block 1204, the scheduled entity may receive a first measurement signal on a first carrier from the PCell. At block 1206, the scheduled entity may receive a second measurement signal on a second carrier from the SCell. In some examples, the first and second measurement signals may be reference signals and/or PDCCHs. For example, the DL traffic and control channel reception and processing circuitry 743 and transceiver 710 shown and described above in reference to FIG. 7 may receive the first and second measurement signals.

At block 1208, the scheduled entity may measure a first signal parameter indicating a first quality of the first measurement signal. At block 1210, the scheduled entity may measure a second signal parameter indicating a second quality of the second measurement signal. In some examples, the first and second signal parameters may be received power measurements or SINR measurements. For example, the DL traffic and control channel reception and processing circuitry 743 and multi-cell management circuitry 741 shown and described above in reference to FIG. 7 may measure the signal parameters of the first and second measurement signals.

At block 1212, the scheduled entity may determine an overall signal parameter from the first and second measured signal parameters. In some examples, the overall signal parameter may include an overall received power (e.g., an average, weighted average, or maximum received power) and/or a maximum SINR. For example, the multi-cell management circuitry 741 shown and described above in reference to FIG. 7 may determine the overall signal parameter.

At block 1214, the scheduled entity may transmit an indication of the overall signal parameter to at least one of the PCell or the SCell. In some examples, the scheduled entity may receive a measurement configuration indicating whether the PCell or the SCell is to receive the overall signal parameter. For example, the multi-cell management circuitry 741, UL traffic and control channel generation and transmission circuitry 742 and transceiver 710 shown and described above in reference to FIG. 7 may transmit the indication of the overall signal parameter.

At block 1216, the scheduled entity may receive an indication to switch the SCell to a PCell based on the overall signal parameter. For example, the multi-cell management circuitry 741, DL traffic and control channel reception and processing circuitry 743 and transceiver 710 shown and described above in reference to FIG. 7 may receive the indication to switch the SCell to the PCell.

Figure 13:
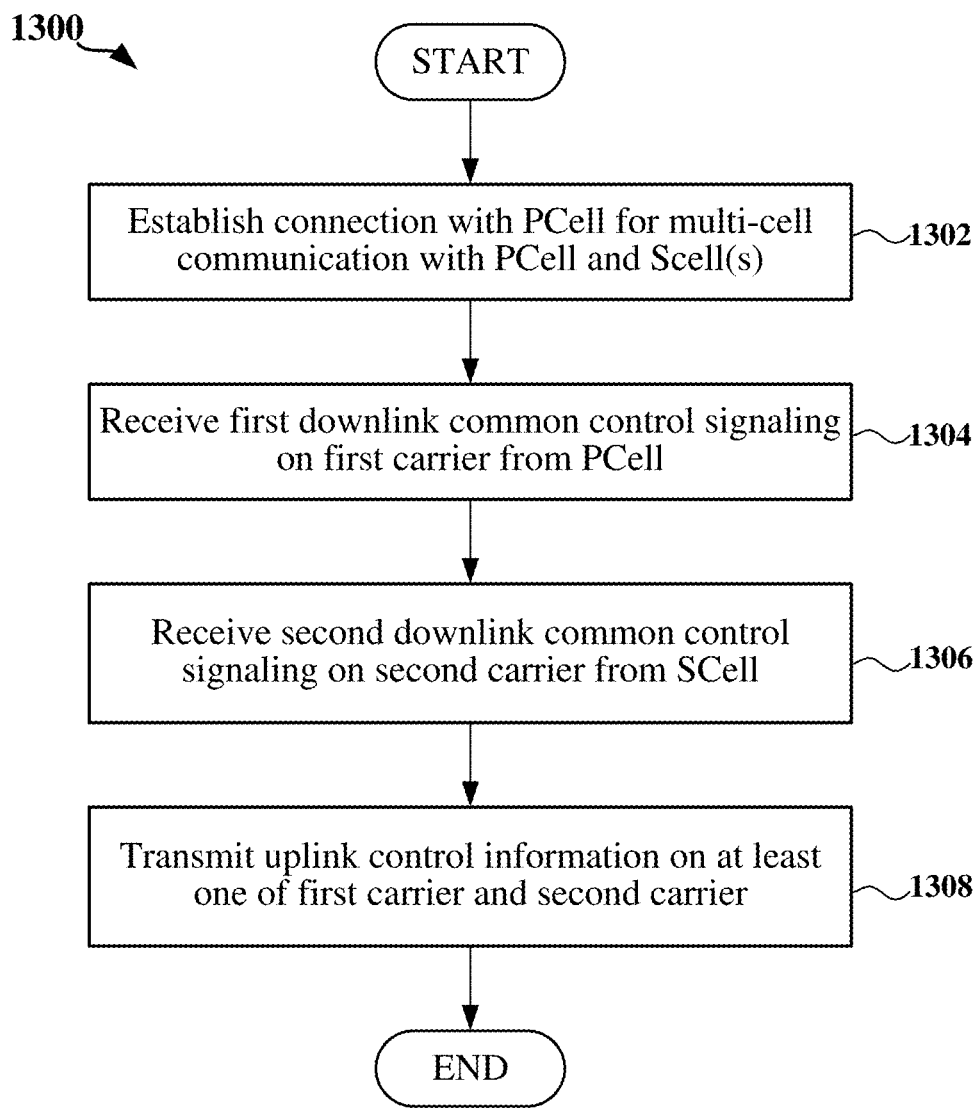
FIG. 13 is a flow chart illustrating another exemplary process for a UE to communicate in a multi-cell transmission environment.

FIG. 13 is a flow chart illustrating another exemplary process 1300 for a UE to communicate in a multi-cell transmission environment in accordance with some aspects of the present disclosure. The process 1300 described in FIG. 13 enables monitoring the common search space on each carrier of each selected PCell and transmission of uplink control information (UCI) to each selected PCell. As described below, some or all illustrated features may be omitted in a particular implementation within the scope of the present disclosure, and some illustrated features may not be required for implementation of all embodiments. In some examples, the process 1300 may be carried out by the scheduled entity 700 illustrated in FIG. 7. In some examples, the process 1300 may be carried out by any suitable apparatus or means for carrying out the functions or algorithm described below.

At block 1302, the scheduled entity may establish a connection with a PCell for multi-cell communication with the PCell and at least one SCell. For example, the multi-cell management circuitry 741 and transceiver 710 shown and described above in reference to FIG. 7 may establish the connection.

At block 1304, the scheduled entity may receive first downlink common control signaling on a first carrier from the PCell. At block 1306, the scheduled entity may receive second downlink common control signaling on a second carrier from the SCell. In some examples, the first and second downlink common control signaling may include common control information transmitted on a PDCCH within a common search space (e.g., resource elements within a subframe or slot forming the common search space). The scheduled entity may be configured to receive the common control signaling from the PCell and SCell via an indication that the SCell is operating as a PCell. For example, the multi-cell management circuitry 741, the DL traffic and control channel reception and processing circuitry 743, and the transceiver 710 shown and described above in reference to FIG. 7 may receive the first and second common control signaling.

At block 1308, the scheduled entity may transmit uplink control information (e.g., on a PUCCH) on at least one of the first carrier or the second carrier. In some examples, the scheduled entity may be configured to receive an indication of a selected one of the PCell or SCell to receive the uplink control information and may transmit the uplink control information to the selected cell. In other examples, the scheduled entity may measure a first signal parameter (e.g., received power or SINR) of a first measurement signal (e.g. a reference signal or PDCCH) received from the PCell on a first carrier and a second signal parameter (e.g., received power or SINR) of a second measurement signal (e.g., a reference signal or PDCCH) received from an SCell on a second carrier, as in blocks 908 and 910 of FIG. 9. The scheduled entity may then be configured to select one of the PCell or the SCell for transmission of the uplink control information thereto based on the first signal parameter and the second signal parameter. For example, the multi-cell management circuitry 741, the UL traffic and control channel generation and transmission circuitry 742, and the transceiver 710 may transmit the uplink control information to at least one of the PCell or SCell.

In one configuration, a scheduled entity (e.g., a UE) in a wireless communication network including a PCell and a SCell includes means for receiving a first reference signal on a first carrier from the PCell, means for receiving a second reference signal on a second carrier from the SCell, and means for connecting to the PCell for multi-cell communication with the PCell and the SCell based on a joint evaluation of both the first reference signal and the second reference signal.

In one aspect, the aforementioned means for receiving a first reference signal on a first carrier from the PCell, means for receiving a second reference signal on a second carrier from the SCell, and means for connecting to the PCell for multi-cell communication with the PCell and the SCell based on a joint evaluation of both the first reference signal and the second reference signal may be the processor(s) 704 shown in FIG. 7 configured to perform the functions recited by the aforementioned means. For example, the aforementioned means for receiving a first reference signal on a first carrier from the PCell, means for receiving a second reference signal on a second carrier from the SCell may include the DL traffic and control channel reception and processing circuitry 743, together with the transceiver 710, shown in FIG. 7. In another aspect, the aforementioned means for connecting to the PCell for multi-cell communication with the PCell and the SCell based on a joint evaluation of both the first reference signal and the second reference signal may include the multi-cell management circuitry 741 in FIG. 7 configured to perform the functions recited by the aforementioned means. In still another aspect, the aforementioned means may be a circuit or any apparatus configured to perform the functions recited by the aforementioned means.

The scheduled entity (e.g., a UE) may further include means for receiving a first measurement signal on the first carrier from the PCell, means for receiving a second measurement signal on the second carrier from the SCell, means for measuring a first signal parameter indicating a first quality of the first measurement signal, means for measuring a second signal parameter indicating a second quality of the second measurement signal, means for determining an overall signal parameter from the first signal parameter and the second signal parameter, and means for utilizing the overall signal parameter to manage the connection with the PCell.

In one aspect, the aforementioned means for receiving a first measurement signal on the first carrier from the PCell, means for receiving a second measurement signal on the second carrier from the SCell, means for measuring a first signal parameter indicating a first quality of the first measurement signal, means for measuring a second signal parameter indicating a second quality of the second measurement signal, means for determining an overall signal parameter from the first signal parameter and the second signal parameter, and means for utilizing the overall signal parameter to manage the connection with the PCell may be the processor(s) 704 shown in FIG. 7 configured to perform the functions recited by the aforementioned means. For example, the aforementioned means for receiving a first measurement signal on the first carrier from the PCell and means for receiving a second measurement signal on the second carrier from the SCell may include the DL traffic and control channel reception and processing circuitry 743, together with the transceiver 710, shown in FIG. 7. In another aspect, the aforementioned means for measuring a first signal parameter indicating a first quality of the first measurement signal, means for measuring a second signal parameter indicating a second quality of the second measurement signal, means for determining an overall signal parameter from the first signal parameter and the second signal parameter, and means for utilizing the overall signal parameter to manage the connection with the PCell may include the multi-cell management circuitry 741 in FIG. 12 configured to perform the functions recited by the aforementioned means. In still another aspect, the aforementioned means may be a circuit or any apparatus configured to perform the functions recited by the aforementioned means.

The scheduled entity (e.g., a UE) may further include means for receiving first downlink common control signaling on the first carrier from the PCell, means for receiving second downlink common control signaling on the second carrier from the SCell, and means for transmitting uplink control information on at least one of the first carrier or the second carrier.

In one aspect, the aforementioned means for receiving first downlink common control signaling on the first carrier from the PCell, means for receiving second downlink common control signaling on the second carrier from the SCell, and means for transmitting uplink control information on at least one of the first carrier or the second carrier may be the processor(s) 704 shown in FIG. 7 configured to perform the functions recited by the aforementioned means. For example, the aforementioned means for receiving first downlink common control signaling on the first carrier from the PCell and means for receiving second downlink common control signaling on the second carrier from the SCell may include the DL traffic and control channel reception and processing circuitry 743, together with the transceiver 710, shown in FIG. 7. In another aspect, the aforementioned means for transmitting uplink control information on at least one of the first carrier or the second carrier may include the multi-cell management circuitry 741, together with the UL traffic and control channel generation and transmission circuitry 742 and the transceiver 710, shown in FIG. 7. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4 and/or 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a user equipment to communicate in a wireless communication network comprising a primary cell (PCell) and a secondary cell (SCell), the method comprising:
   receiving a first reference signal on a first carrier from the PCell prior to connecting to the PCell or the SCell;
   receiving a second reference signal on a second carrier from the SCell prior to connecting to the PCell or the SCell;
   connecting to the PCell for multi-cell communication with the PCell and the SCell based on a joint evaluation of both the first reference signal and the second reference signal; and
   after connecting to the PCell for multi-cell communication with the PCell and the SCell:
   receiving a first measurement signal on the first carrier from the PCell,
   receiving a second measurement signal on the second carrier from the SCell,
   measuring a first signal parameter indicating a first quality of the first measurement signal,
   measuring a second signal parameter indicating a second quality of the second measurement signal,
   determining an overall signal parameter from the first signal parameter and the second signal parameter, and
   utilizing the overall signal parameter to manage the connection with the PCell.

2. The method of claim 1, wherein the first measurement signal and the second measurement signal each comprise reference signals, wherein the reference signals comprise synchronization signal blocks, channel state information reference signals or demodulation reference signals.

3. The method of claim 2, wherein the first signal parameter comprises a first received power of the first measurement signal and the second signal parameter comprises a second received power of the second measurement signal, and wherein determining the overall signal parameter further comprises:
   calculating an overall received power from the first received power and the second received power.

4. The method of claim 3, wherein the overall received power comprises an average received power, a weighted average received power, or a maximum received power.

5. The method of claim 4, wherein the overall received power comprises the weighted average received power, and further comprising:
   receiving a respective weight to be applied to each of the first received power and the second received power for use in calculating the weighted average received power.

6. The method of claim 3, wherein utilizing the overall signal parameter to manage the connection with the PCell further comprises:
   transmitting a measurement report indicating the overall received power to the PCell.

7. The method of claim 1, wherein the first measurement signal is received from a first transmission and reception point (TRP) and the second measurement signal is received from a second TRP, wherein the first TRP and the second TRP are in different physical locations.

8. The method of claim 1, wherein the first measurement signal comprises at least a first physical downlink control channel (PDCCH) and the second measurement signal comprises at least a second PDCCH.

9. The method of claim 8, wherein the first signal parameter comprises a first signal-to-interference-plus-noise ratio (SINR) and the second signal parameter comprises a second SINR, and wherein determining the overall signal parameter further comprises:
   determining a maximum SINR from the first SINR and the second SINR.

10. The method of claim 9, wherein utilizing the overall signal parameter to manage the connection with the PCell further comprises:
    triggering a radio link failure timer based on the maximum SINR.

11. The method of claim 1, wherein utilizing the overall signal parameter to manage the connection with the PCell further comprises:
    transmitting an indication of the overall signal parameter to at least one of the PCell or the SCell.

12. The method of claim 11, further comprising:
    receiving a measurement configuration indicating whether the overall signal parameter is transmitted to the PCell or the SCell.

13. The method of claim 11, further comprising:
    receiving an indication to switch the SCell to the PCell based on the overall signal parameter.

14. A method for a user equipment to communicate in a wireless communication network comprising a primary cell (PCell) and a secondary cell (SCell), the method comprising:
- receiving a first reference signal on a first carrier from the PCell prior to connecting to the PCell or the SCell;
- receiving a second reference signal on a second carrier from the SCell prior to connecting to the PCell or the SCell;
- connecting to the PCell for multi-cell communication with the PCell and the SCell based on a joint evaluation of both the first reference signal and the second reference signal;
- receiving first downlink common control signaling on the first carrier from the PCell;
- receiving second downlink common control signaling on the second carrier from the SCell; and
- transmitting uplink control information on at least one of the first carrier or the second carrier by:
  - receiving a first measurement signal on the first carrier from the PCell;
  - receiving a second measurement signal on the second carrier from the SCell;
  - measuring a first signal parameter indicating a first quality of the first measurement signal;
  - measuring a second signal parameter indicating a second quality of the second measurement signal; and
  - selecting one of the PCell or the SCell for transmission of the uplink control information thereto based on the first signal parameter and the second signal parameter.

15. The method of claim 14, wherein transmitting uplink control information on at least one of the first carrier or the second carrier further comprises:
- receiving an indication of a selected cell to receive the uplink control information selected from the PCell and the SCell; and
- transmitting the uplink control information to the selected cell.

16. A scheduled entity in a wireless communication network comprising a primary cell (PCell) and a secondary cell (SCell), the scheduled entity comprising:
- a transceiver for wireless communication with a scheduling entity;
- a memory; and
- a processor communicatively coupled to the transceiver and the memory, the processor configured to:
  - receive a first reference signal on a first carrier from the PCell prior to connecting to the PCell or the SCell;
  - receive a second reference signal on a second carrier from the SCell prior to connecting to the PCell or the SCell;
  - connect to the PCell for multi-cell communication with the PCell and the SCell based on a joint evaluation of both the first reference signal and the second reference signal; and
  - after connecting to the PCell for multi-cell communication with the PCell and the SCell:
    - receive a first measurement signal on the first carrier from the PCell via the transceiver;
    - receive a second measurement signal on the second carrier from the SCell via the transceiver;
    - measure a first signal parameter indicating a first quality of the first measurement signal;
    - measure a second signal parameter indicating a second quality of the second measurement signal;
    - determine an overall signal parameter from the first signal parameter and the second signal parameter; and
    - utilize the overall signal parameter to manage the connection with the PCell and the SCell.

17. The scheduled entity of claim 16, wherein the overall signal parameter comprises an average received power, a weighted average received power, or a maximum received power.

18. The scheduled entity of claim 16, wherein the first measurement signal and the second measurement signal each comprise reference signals, wherein the reference signals comprise synchronization signal blocks, channel state information reference signals or demodulation reference signals.

19. The scheduled entity of claim 18, wherein the first signal parameter comprises a first received power of the first measurement signal and the second signal parameter comprises a second received power of the second measurement signal, and wherein the processor is further configured to:
- calculate an overall received power from the first received power and the second received power.

20. The scheduled entity of claim 19, wherein the processor is further configured to:
- transmit a measurement report indicating the overall received power to the PCell.

21. The scheduled entity of claim 16, wherein the first measurement signal comprises at least a first physical downlink control channel (PDCCH) and the second measurement signal comprises at least a second PDCCH.

22. The scheduled entity of claim 21, wherein the first signal parameter comprises a first signal-to-interference-plus-noise ratio (SINR) and the second signal parameter comprises a second SINR, and wherein the processor is further configured to:
- determine a maximum SINR from the first SINR and the second SINR.

23. The scheduled entity of claim 22, wherein the processor is further configured to:
- trigger a radio link failure timer based on the maximum SINR.

24. The scheduled entity of claim 16, wherein the processor is further configured to:
- receive an indication to switch the SCell to the PCell based on the overall signal parameter.

25. A scheduled entity in a wireless communication network comprising a primary cell (PCell) and a secondary cell (SCell), the scheduled entity comprising:
- a transceiver for wireless communication with a scheduling entity;
- a memory; and
- a processor communicatively coupled to the transceiver and the memory, the processor configured to:
  - receive a first reference signal on a first carrier from the PCell prior to connecting to the PCell or the SCell;
  - receive a second reference signal on a second carrier from the SCell prior to connecting to the PCell or the SCell;
  - connect to the PCell for multi-cell communication with the PCell and the SCell based on a joint evaluation of both the first reference signal and the second reference signal;
  - receive first downlink common control signaling on the first carrier from the PCell;
  - receive second downlink common control signaling on the second carrier from the SCell; and transmit uplink control information on at least one of the first carrier or the second carrier by:
  receiving a first measurement signal on the first carrier from the PCell;
  receiving a second measurement signal on the second carrier from the SCell;
  measuring a first signal parameter indicating a first quality of the first measurement signal;
  measuring a second signal parameter indicating a second quality of the second measurement signal; and
  selecting one of the PCell or the SCell for transmission of the uplink control information thereto based on the first signal parameter and the second signal parameter.

26. A scheduled entity in a wireless communication network comprising a primary cell (PCell) and a secondary cell (SCell), the scheduled entity comprising:
  means for receiving a first reference signal on a first carrier from the PCell prior to connecting to the PCell or the SCell;
  means for receiving a second reference signal on a second carrier from the SCell prior to connecting to the PCell or the SCell;
  means for connecting to the PCell for multi-cell communication with the PCell and the SCell based on a joint evaluation of both the first reference signal and the second reference signal;
  means for, after connecting to the PCell for multi-cell communication with the PCell and the SCell,
    receiving a first measurement signal on the first carrier from the PCell;
    receiving a second measurement signal on the second carrier from the SCell;
    measuring a first signal parameter indicating a first quality of the first measurement signal;
    measuring a second signal parameter indicating a second quality of the second measurement signal;
    determining an overall signal parameter from the first signal parameter and the second signal parameter; and
    utilizing the overall signal parameter to manage the connection with the PCell.

27. The scheduled entity of claim 26, wherein the overall signal parameter comprises an average received power, a weighted average received power, or a maximum received power.

28. A scheduled entity in a wireless communication network comprising a primary cell (PCell) and a secondary cell (SCell), the scheduled entity comprising:
  means for receiving a first reference signal on a first carrier from the PCell prior to connecting to the PCell or the SCell;
  means for receiving a second reference signal on a second carrier from the SCell prior to connecting to the PCell or the SCell;
  means for connecting to the PCell for multi-cell communication with the PCell and the SCell based on a joint evaluation of both the first reference signal and the second reference signal;
  means for receiving first downlink common control signaling on the first carrier from the PCell;
  means for receiving second downlink common control signaling on the second carrier from the SCell; and
  means for transmitting uplink control information on at least one of the first carrier or the second carrier, wherein the means for transmitting uplink control information on at least one of the first carrier or the second carrier comprises:
    means for receiving a first measurement signal on the first carrier from the PCell;
    means for receiving a second measurement signal on the second carrier from the SCell;
    means for measuring a first signal parameter indicating a first quality of the first measurement signal;
    means for measuring a second signal parameter indicating a second quality of the second measurement signal; and
    means for selecting one of the PCell or the SCell for transmission of the uplink control information thereto based on the first signal parameter and the second signal parameter.

* * * * *